(12) United States Patent
Hayashi et al.

(10) Patent No.: US 9,042,457 B2
(45) Date of Patent: May 26, 2015

(54) IMAGE DECODING APPARATUS AND IMAGE CODING APPARATUS WTH PARALLEL DECODING

(75) Inventors: Yoshiteru Hayashi, Kyoto (JP); Hiroshi Amano, Osaka (JP); Masayasu Iguchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 338 days.

(21) Appl. No.: 12/673,408

(22) PCT Filed: Jun. 5, 2009

(86) PCT No.: PCT/JP2009/002546
§ 371 (c)(1),
(2), (4) Date: Feb. 12, 2010

(87) PCT Pub. No.: WO2009/150808
PCT Pub. Date: Dec. 17, 2009

(65) Prior Publication Data
US 2011/0200115 A1  Aug. 18, 2011

(30) Foreign Application Priority Data
Jun. 10, 2008  (JP) .................................. 2008-151246

(51) Int. Cl.
*H04N 7/12*  (2006.01)
*H04N 19/436*  (2014.01)
(Continued)

(52) U.S. Cl.
CPC ........... *H04N 19/436* (2014.11); *H04N 19/176* (2014.11); *H04N 19/70* (2014.11);
(Continued)

(58) Field of Classification Search
USPC .......................................... 375/240.01, 240.1
IPC ....................................................... H04N 7/12
See application file for complete search history.

(56) References Cited

U.S. PATENT DOCUMENTS 5,835,144 A * 11/1998 Matsumura et al. ..... 375/240.23
7,596,279 B2 * 9/2009 Sugimoto et al. ............. 382/238
(Continued)

FOREIGN PATENT DOCUMENTS

CN  101022534  8/2007
CN  101064848  10/2007
(Continued)

OTHER PUBLICATIONS

International Search Report issued Sep. 1, 2009 in International (PCT) Application No. PCT/JP2009/002546.
(Continued)

*Primary Examiner* — David J. Czekaj
*Assistant Examiner* — Tracy Li
(74) *Attorney, Agent, or Firm* — Wenderoth, Lind & Ponack, L.L.P.

(57) ABSTRACT

An image decoding apparatus which decodes, in parallel, a coded stream having processing order dependency includes: a slice data predecoding unit which predecodes, on a macroblock group basis, macroblock groups included in the coded stream to generate macroblock decoding information necessary for decoding other macroblock groups; and a first macroblock decoding unit and a second macroblock decoding unit each of which decodes a corresponding one of macroblock groups included in the coded stream in parallel. Each of the macroblock decoding units, when decoding the corresponding one of macroblock groups, uses the macroblock decoding information that has been generated for the other macroblock group.

14 Claims, 22 Drawing Sheets

(51) Int. Cl.
*H04N 19/176* (2014.01)
*H04N 19/70* (2014.01)
*H04N 19/134* (2014.01)
*H04N 19/61* (2014.01)
*H04N 19/147* (2014.01)
*H04N 19/44* (2014.01)
*H04N 19/13* (2014.01)
*H04N 19/124* (2014.01)
*H04N 19/132* (2014.01)
*H04N 19/40* (2014.01)

(52) U.S. Cl.
CPC ............. *H04N 19/13* (2014.11); *H04N 19/134* (2014.11); *H04N 19/61* (2014.11); *H04N 19/124* (2014.11); *H04N 19/132* (2014.11); *H04N 19/147* (2014.11); *H04N 19/44* (2014.11); *H04N 19/40* (2014.11)

(56) References Cited

U.S. PATENT DOCUMENTS

| | | | |
|---|---|---|---|
| 7,626,518 | B2* | 12/2009 | Hussain et al. .................. 341/51 |
| 8,014,451 | B2* | 9/2011 | Suh .......................... 375/240.24 |
| 2002/0009287 | A1* | 1/2002 | Ueda .............................. 386/68 |
| 2003/0219072 | A1 | 11/2003 | MacInnis et al. |
| 2004/0028141 | A1* | 2/2004 | Hsiun et al. .............. 375/240.25 |
| 2004/0091052 | A1 | 5/2004 | Youn et al. |
| 2005/0238097 | A1 | 10/2005 | Youn et al. |
| 2006/0093042 | A1 | 5/2006 | Kashima et al. |
| 2006/0093043 | A1 | 5/2006 | Kashima et al. |
| 2007/0183508 | A1* | 8/2007 | Kudo et al. ............. 375/240.25 |
| 2007/0214367 | A1 | 9/2007 | Watanabe et al. |
| 2007/0253491 | A1 | 11/2007 | Ito et al. |
| 2010/0322317 | A1 | 12/2010 | Yoshimatsu et al. |

FOREIGN PATENT DOCUMENTS

| | | |
|---|---|---|
| EP | 2 357 825 | 8/2011 |
| JP | 10-234043 | 9/1998 |
| JP | 2006-129284 | 5/2006 |
| JP | 2007-251605 | 9/2007 |
| JP | 2007-251865 | 9/2007 |

OTHER PUBLICATIONS

MPEG-2 Recommendation ITU-T H.262, 1995 (ISO/IEC 13818-2).
MPEG-4 Information technology—Coding of audio-visual objects—Parts 2, Visual Second Edition, Dec. 1, 2001 (ISO/IEC 14496-2).
H.264/MPEG-4 AVC, Information technology—Coding of audio-visual objects—Part 10 Advanced Video Coding Second Edition, Oct. 1, 2004 (ISO/IEC 14496-10).
VC-1 Compressed Video Bitstream Format and Decoding Process (SMPTE 421M-2006).
Extended European Search Report issued Feb. 5, 2013 in corresponding European Application No. 09762239.3.
Eiji Iwata et al., "Exploiting Coarse-Grain Parallelism in the MPEG-2 Algorithm", Sep. 1998, XP002300648.
Thomas Wiegan et al., "Draft ITU-T Recommendation and Final Draft International Standard of Joint Video Specification (ITU-T Rec. H.264, ISO/IEC 14496-1-AVC)", Mar. 14, 2003, XP030005712.
Jike Chong et al., "Efficient Parallelization of H.264 Decoding with Macro Block Level Scheduling", Jul. 1, 2007, XP031124015.
Full English Language Machine Translation of JP 10-234043, published Sep. 2, 1998.
Office Action mailed Oct. 11, 2013 in corresponding European Application No. 09762239.3.
Detlev Marpe et al., "Context-based Adaptive Binary Arithmetic Coding in the H.264/AVC Video Compression Standard", IEEE Transactions on Circuits and Systems for Video Technology, IEEE Service Center, Piscataway, NJ, USA, vol. 13, No. 7, Jul. 1, 2003, pp. 620-636, XP011099255.

* cited by examiner

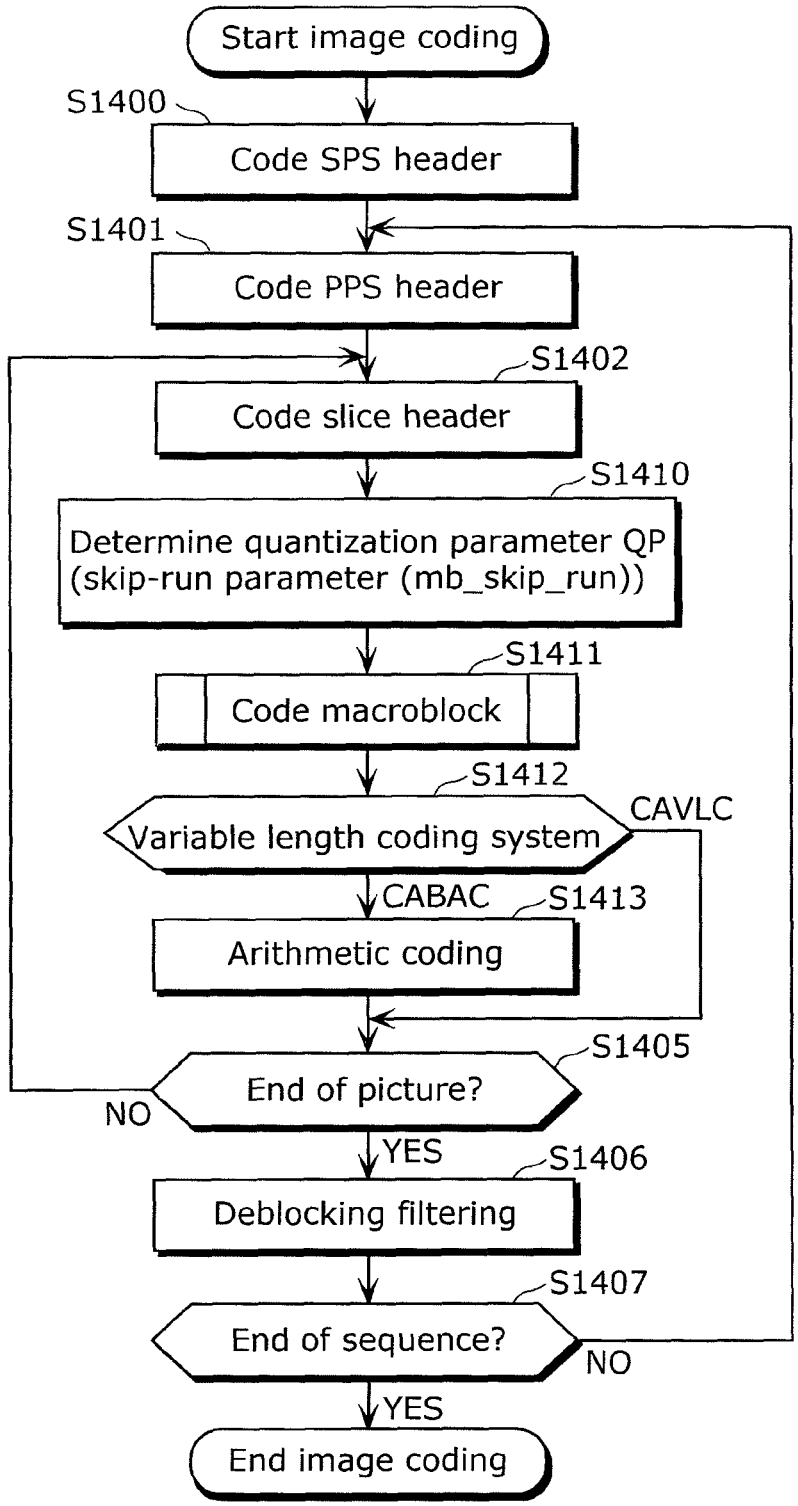

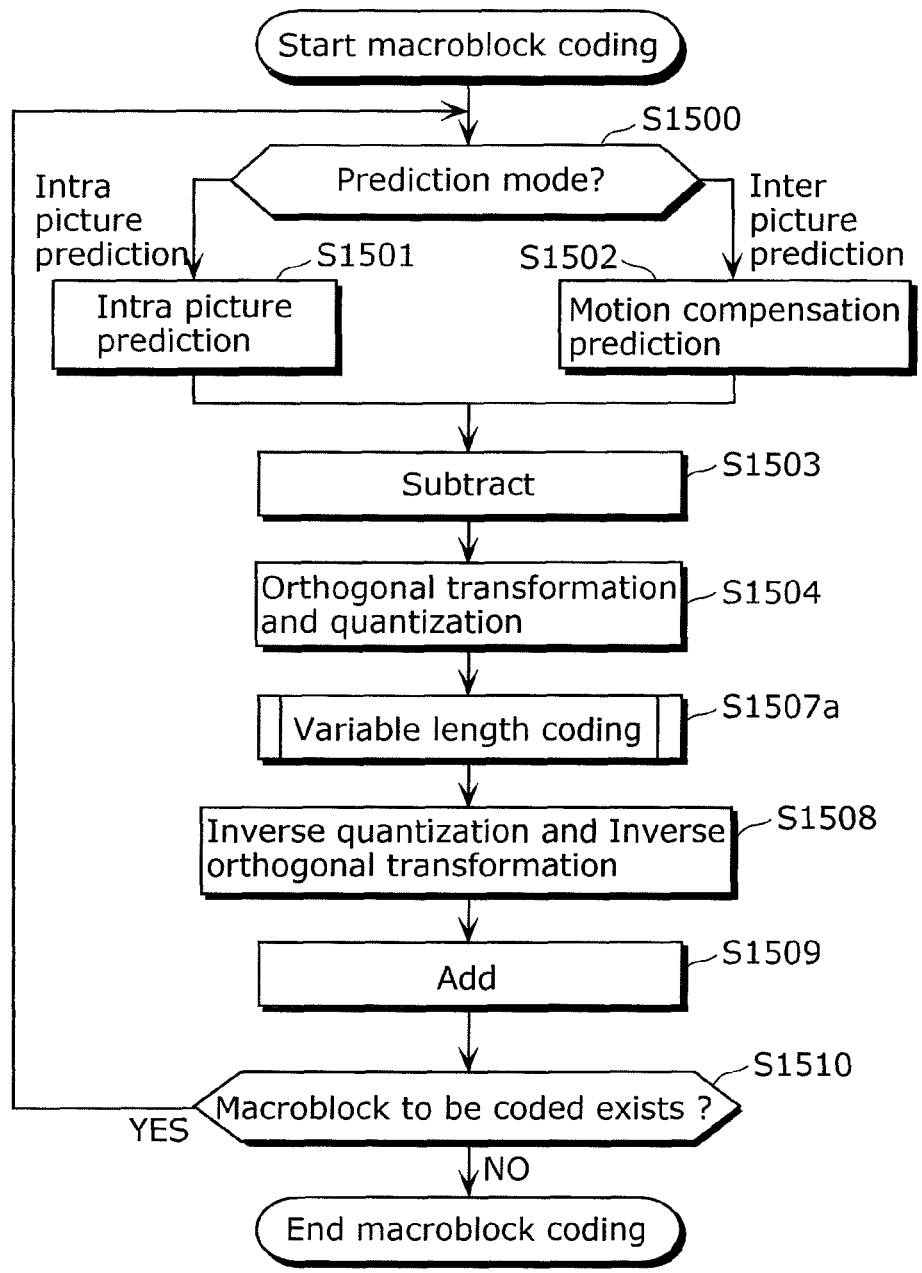

Processing order dependency

IMAGE DECODING APPARATUS AND IMAGE CODING APPARATUS WTH PARALLEL DECODING

TECHNICAL FIELD

The present invention relates to an image decoding apparatus, an image coding apparatus, an image decoding method, and an image coding method for decoding or coding video data.

BACKGROUND ART

The Motion Pictures Experts Group (MPEG) coding system which utilizes an interframe difference is often used as a technique for performing compression coding (hereinafter simply referred to as "coding") on video data. MPEG-2 (ISO/IEC13818-2) and MPEG-4 (ISO/IEC14496-2) have been used conventionally as the MPEG coding systems. In addition, new coding systems such as H.264/MPEG-4AVC (ISO/IEC14496-10) (hereinafter simply referred to as "H.264") or VC-1 (SMPTE 421M) have come into use in recent years.

According to such coding systems, a single picture plane (picture) is divided into blocks each having the predetermined number of pixels (luma component: 16×16 pixels), and decoding or coding is performed on a block by block basis. The pixel block is called macroblock.

According to the new coding systems represented by H.264, when coding a macroblock, the correlation between a current macroblock to be processed and a macroblock neighbouring on the current macroblock (hereinafter referred to as an neighbouring macroblock) is utilized to increase compression efficiency. That means there is a positional dependency in the new coding systems.

FIG. 22 is a diagram which shows a positional dependency according to H.264.

To be specific, when decoding or coding a macroblock as a current macroblock to be processed, it is necessary to refer to the results of processing four neighbouring macroblocks including a left neighbouring macroblock A, an upper left neighbouring macroblock D, an upside neighbouring macroblock B, and an upper right neighbouring macroblock C, as shown in FIG. 22.

For that reason, the neighbouring macroblocks need to be decoded or coded in advance. In other words, there is a positional dependency between the left neighbouring macroblock A, the upper left neighbouring macroblock D, the upside neighbouring macroblock B, and the upper right neighbouring macroblock C in decoding processing and coding processing.

For carrying out parallel processing by using plural decoding units that decode a macroblock or coding units that code a macroblock, in order to perform decoding or coding at high speed, it is necessary to solve the positional dependency. In Patent Literature 1, a method for solving the positional dependency is provided.

FIG. 23 is a diagram which shows the procedure of an image decoding apparatus and an image coding apparatus described in the above-mentioned Patent Literature 1. The number given to each macroblock MB indicates a processing order when the macroblock is decoded or coded. That means the macroblocks MB having the same number are processed concurrently in parallel.

As shown in FIG. 23, the image decoding apparatus and the image coding apparatus of the above-mentioned Patent Literature 1 start processing from the upper left macroblock MB of a picture Pic and, when processing a given macroblock MB, process, in parallel, a macroblock MB located at the left side by two columns on a row under the given macroblock MB, thereby solving the positional dependency described above.

CITATION LIST

Patent Literature

Japanese Unexamined Patent Application Publication No. 2006-129284

SUMMARY OF INVENTION

Technical Problem

However, even with the image decoding apparatus and the image coding apparatus of the above-mentioned Patent Literature 1, decoding or coding in the new coding systems represented by H.264 cannot be implemented in parallel, leading to a problem that it is not possible to speed up decoding or coding.

With the new coding systems represented by H.264, the correlation with the macroblock that has been decoded or coded immediately previously is also utilized to increase the compression efficiency. According to H.264, for example, a quantization parameter QP of a given macroblock is calculated by using a quantization parameter of a macroblock that has been processed immediately previously (QP_PREV). For that reason, when decoding or coding a given macroblock, it is necessary to refer to a macroblock that has been processed immediately previously. That means, in addition to the positional dependency described above, there is a processing order dependency.

FIG. 24 is a diagram which shows a processing order dependency according to H.264.

With the MPEG coding system, macroblocks MB in a picture Pic are processed in the order of raster scanning, as shown in FIG. 24. Here, the number given to each macroblock MB in FIG. 24 indicates the processing order and the arrows indicate the processing order dependency. Since a macroblock MB processed immediately previously is typically the left neighbouring macroblock MB of a current macroblock MB to be processed, the processing order dependency of the current macroblock MB is the same as the positional dependency. However, in the case where a macroblock MB located at the left end of the picture Pic is processed, a macroblock MB that has been processed immediately previously is a macroblock MB located at the right end on the row immediately above. In FIG. 24, for example, a macroblock MB processed immediately previous to the ninth macroblock MB is the eighth macroblock MB that is the macroblock MB located at the right end on the row immediately above.

With the image decoding apparatus and the image coding apparatus of the above-mentioned Patent Literature 1, a macroblock MB located at the right end on the row immediately above a macroblock MB located at the left end of the picture Pic (current macroblock to be processed) is not processed prior to the current macroblock, and thus the processing order dependency is not solved. That means decoding or coding cannot be performed in parallel by the image decoding apparatus and the image coding apparatus of the Patent Literature 1 described above.

Therefore, the present invention has been conceived in view of the above-described problem and aims to provide an image decoding apparatus, an image coding apparatus, an image decoding method, and an image coding method for solving processing order dependency that exists in the new coding system represented by H.264 to decode and code video data in parallel.

Solution to Problem

In order to achieve the object described above, an image decoding apparatus according to an embodiment of the present invention is an image decoding apparatus which decodes a coded stream generated by coding, on a block-by-block basis, a picture including blocks, the image decoding apparatus including: a predecoding unit configured to perform predecoding to generate block decoding information, on a block group basis, on a block group which contains blocks and which is included in the coded stream, the predecoding being part of the decoding, the block decoding information being a parameter necessary for decoding an other block group; block decoding units each configured to perform the decoding on a block-by-block basis on one of block groups in parallel, the block groups being included in the coded stream and different from each other, wherein, when the decoding is performed on the block group, each of the block decoding units is configured to perform the decoding on a corresponding one of the block groups by using the block decoding information generated in the predecoding performed on an other block group on which an other block decoding unit perform the decoding.

For example, in the case where, when the first block decoding unit and the second block decoding unit perform decoding on the first block group and the second block group, respectively, the first and the second block group have a processing order dependency which exists in a new coding system represented by H.264, block decoding information (a quantization parameter, for example) that is generated by predecoding (variable length decoding) the first block group is required for decoding the second block group. Thus, according to an aspect of the present invention, predecoding is performed on the first block group prior to decoding the first block group, and the first block group and the second block group are decoded in parallel by using the block decoding information obtained through the predecoding. As described above, according to an aspect of the present invention, block decoding units can solve the processing order dependency existing in new coding systems represented by H.264 and perform decoding processing in parallel without sequentially decoding the block groups in a predetermined processing order. Further, according to an aspect of the present invention, each of the block decoding units performs all of the processes of decoding on the block group included in a coded stream, instead of performing the processes of decoding other than the predecoding on the block group on which predecoding has been perfumed, so that it is not necessary to generate a partly coded stream that includes block groups on which predecoding has been performed. The partly coded stream has a greater amount of data than that of the original coded stream. Therefore, according to an aspect of the present invention, since the block decoding units perform all of the decoding on the block groups included in the original coded stream, it is possible to reduce the capacity of a buffer in which a stream to be decoded is temporarily stored.

Further, the predecoding unit may further be configured to insert, at a beginning of each of the block groups in the coded stream, a bit pattern by which the beginning can be identified uniquely, and each of the block decoding units may be configured to search for the bit pattern inserted into the coded stream to find a block group on which the decoding is to be performed by the block decoding unit, and to decode the block group.

With the above structure, since the bit pattern is inserted at the beginning of each of block groups of the coded stream, each of the block decoding units can easily find the block group to be decoded, without performing variable length decoding on the coded stream sequentially starting from the beginning of the coded stream.

Further, the predecoding unit may further be configured to insert the generated block decoding information into the coded stream, and each of the block decoding units may be configured to obtain the coded stream into which the block decoding information is inserted, and to perform the decoding on the block group by using the block decoding information inserted into the coded stream.

With the above structure, since the block decoding information is inserted into the coded stream, each of the block decoding units can obtain the block decoding information when obtaining the coded stream, thereby allowing easy obtainment of the block decoding information.

Further, the predecoding unit, when generating the block decoding information, may be configured to generate, as the block decoding information, a difference between a predetermined coefficient and a coefficient which is obtained by performing the predecoding on the block group and is necessary for the decoding of a block located at the end in the block group.

With the above structure, since a difference between the coefficient necessary for decoding the block located at the end (a quantization parameter, for example) and the predetermined coefficient (an initial value of the quantization parameter stored in a slice header) is generated as the block decoding information, the amount of data of the block decoding information can be lowered than in the case of generating a coefficient of the block located at the end as the block decoding information.

In order to achieve the object described above, an image coding apparatus according to an embodiment of the present invention is an image coding apparatus which codes, on a block-by-block basis, a picture including block groups that contains blocks, the image coding apparatus including: block coding units each configured to code one of block groups on a block-by-block basis in parallel, the block groups being included in the picture and different from each other, and an adjusting unit configured to match an intermediate stream with a coded stream generated by sequentially coding the block groups included in the picture in a predetermined processing order, by adjusting parameters used for coding and included in the intermediate stream generated by the coding performed by the block coding units.

With the above structure, it is possible, even when the plural block coding units code plural block groups in parallel, to generate the same stream as the coded stream generated when the plural block groups are sequentially coded in a predetermined processing order, due to adjustment of a parameter (a quantization parameter, for example) performed by the adjusting unit. As a result, it is possible to solve the processing order dependency existing in the new coding systems represented by H.264, and to perform coding in parallel.

Further, the adjusting unit may be configured to determine the parameters used for the coding performed by the block coding units, and each of the block coding units may be configured to perform the coding using one of the parameters determined by the adjusting unit, so that the intermediate stream that matches with the coded stream is generated.

With the above structure, since coding is carried out by using a parameter determined for each of the block coding units, each of the block coding units can know a predetermined parameter used for coding performed by other block coding units even before the coding is performed, process, by using the predetermined parameter, another parameter used for coding performed by itself to include into a coded stream. As a result, it is possible to easily generate an intermediate stream matching the coded stream.

Further, when coding the block groups, each of the block coding units may be configured to include one of the parameters used for coding the block group, in the coded block group generated by coding the block groups, and to store at least a part of the parameter as a stored parameter, and the adjusting unit may be configured to match the intermediate stream with the coded stream, by modifying the parameters of the coded block groups, for each of the coded block groups included in the generated intermediate stream, by using the stored parameter which has so been used for coding of the coded block group other than a current coded block group and which has been stored.

With the above structure, since the intermediate stream is corrected to match the coded stream after generated, it is possible to perform coding that is more suitable than in the case where a parameter is determined in advance and coding is performed according to the parameter as described above.

It should be noted that the present invention can be implemented, in addition to implementation as an image decoding apparatus and an image coding apparatus as described above, as an image decoding method, as an image coding method, as a program which, when loaded into a computer, allows a computer to perform decoding or coding, as a recording medium that stores the program, and as an integrated circuit.

Advantageous Effects of Invention

With the image decoding apparatus and the image coding apparatus according to the present invention, it is possible to decode in parallel a coded image that has a processing order dependency, which allows the coded image to be decoded at high speed, and to code in parallel an image in a coding system that has a processing order dependency, which allows the image to be coded at high speed.

BRIEF DESCRIPTION OF DRAWINGS

FIG. 17 is a flow chart which shows an operation of the image coding apparatus according to the modification of Embodiment 2 of the present invention.

FIG. 19 is a flow chart which shows details of coding processing performed by the macroblock coding unit according to the modification of Embodiment 2 of the present invention.

DESCRIPTION OF EMBODIMENTS

The following describes embodiments in which the present invention is applied to an image decoding apparatus and an image coding apparatus each of which corresponds to a coding system according to H.264 with reference to the drawings. It is to be noted that embodiments below describe the image decoding apparatus and the image coding apparatus according to H.264, however, the present invention can be implemented, in the same manner as embodiments described below, to any video coding systems as long as the video coding system has the processing order dependency.

Embodiment 1

Figure 1:
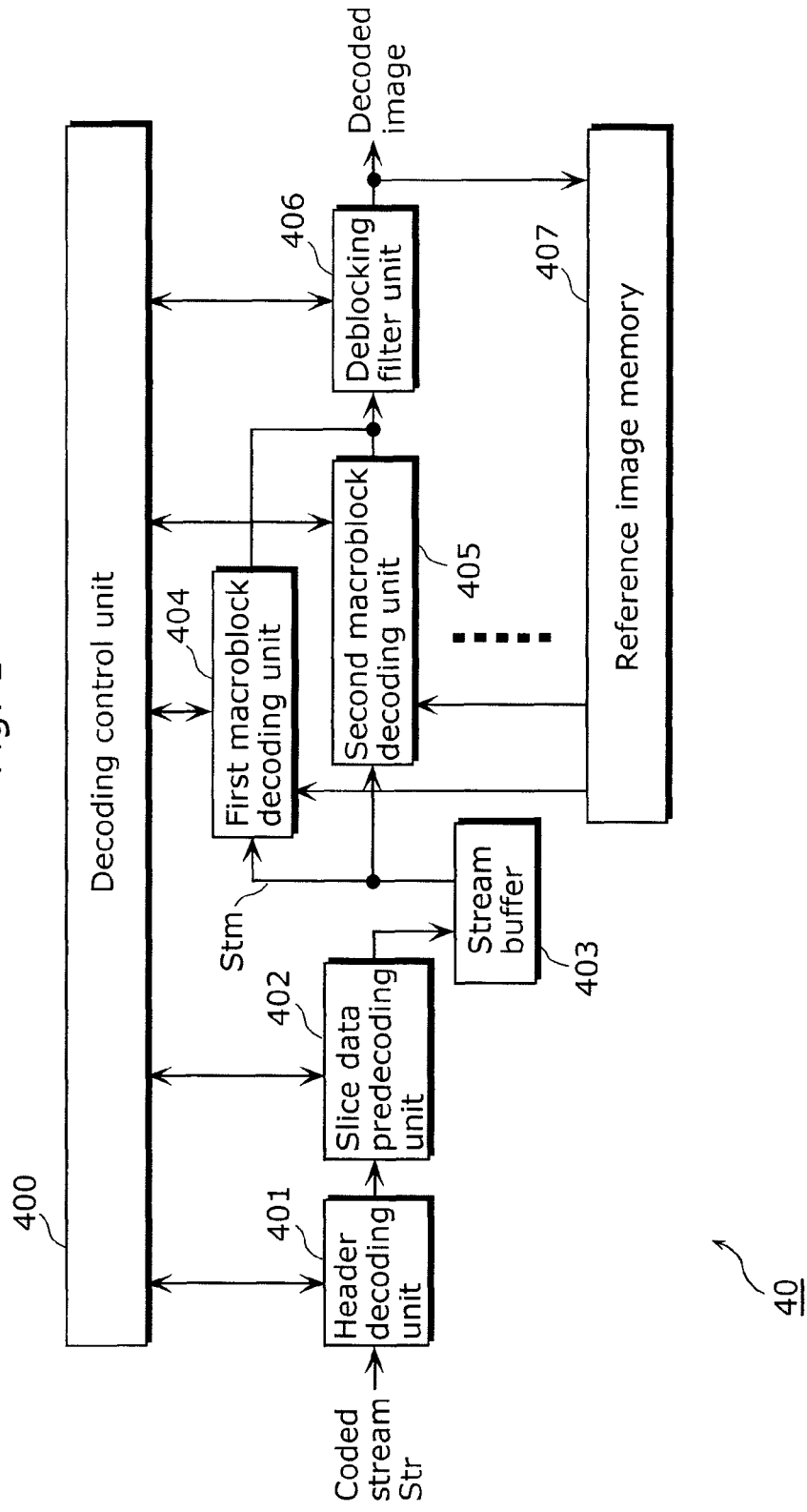
FIG. 1 is a block diagram according to Embodiment 1 of the present invention.

FIG. 1 is a block diagram of an image decoding apparatus according to Embodiment 1 of the present invention.

An image decoding apparatus 40 includes: a decoding control unit 400; a header decoding unit 401; a slice data predecoding unit 402; a stream buffer 403; a first macroblock decoding unit 404; a second macroblock decoding unit 405; deblocking filter unit 406; and a reference image memory 407, as shown in FIG. 1. It is to be noted that the first macroblock decoding unit 404 and the second macroblock decoding unit 405 are collectively called a macroblock decoding unit in the case where it is not necessary to differentiate between them.

The following describes an operation of each component of the image decoding apparatus 40 as shown in FIG. 1.

The header decoding unit 401 obtains coded stream Str coded according to H.264 and sequentially decodes a header included in the coded stream Str.

The slice data predecoding unit 402 obtains, from the header decoding unit 401, the coded stream Str in which the header is decoded, and decodes a parameter (a parameter for parallel processing) that is needed in advance for decoding, in parallel, a macroblock included in the coded stream Str. Further, the slice data predecoding unit 402 processes the coded stream Str by using a result of decoding of the parameter for parallel processing, and outputs the coded stream Str that has been processed (hereinafter referred to as a processed coded stream Stm) to the stream buffer 403. This allows the processed coded stream Stm to be temporarily held in the stream buffer.

The first macroblock decoding unit 404 and the second macroblock decoding unit 405 read the processed coded stream Stm from the stream buffer 403, and decode a macroblock that is allocated to the respective macroblock decoding units, from among coded macroblocks included in the processed coded stream Stm. At this time, each of the first macroblock decoding unit 404 and the second macroblock decoding unit 405 reads a reference image to be used for motion compensation prediction from the reference image memory 407 as necessary, and decodes the macroblock by using the reference image that has been read. It is to be noted that the reference image is made of pixel data. As a result, the first macroblock decoding unit 404 and the second macroblock decoding unit 405 output a reconstructed image that is pixel data which has been reconstructed, to the deblocking filter unit 406.

The deblocking filter unit 406 performs deblocking filtering that removes block noise from the reconstructed image, thereby generating and outputting a decoded image. Further, the deblocking filter unit 406 outputs the decoded image outside the image decoding apparatus 40, and write the decoded image into the reference image memory 407 to be temporarily held by the reference image memory 407, so that the decoded image is used as the reference image for decoding the macroblock.

The decoding control unit 400 controls the entire image decoding processing by controlling the header decoding unit 401, the slice data predecoding unit 402, the first macroblock decoding unit 404, the second macroblock decoding unit 405 and the deblocking filter unit 406, and for example, instructs these components to start processing.

Figure 2:
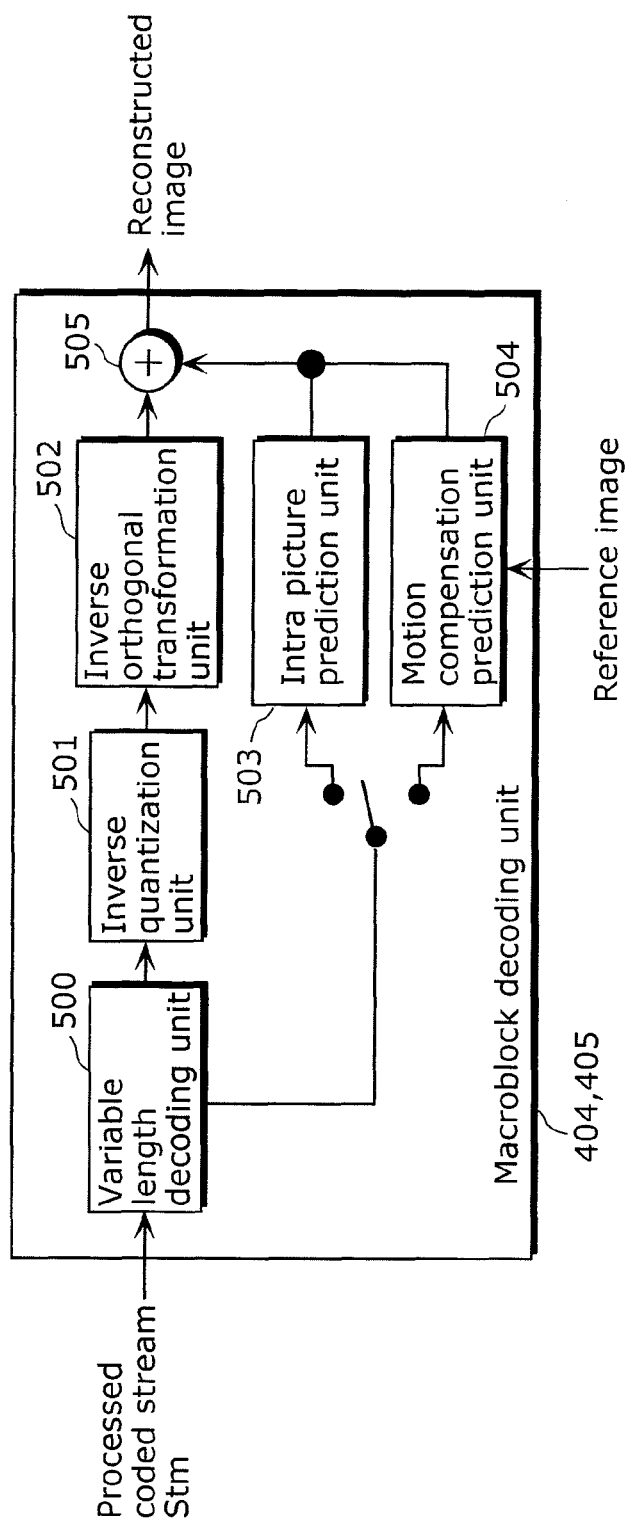
FIG. 2 is a block diagram of a macroblock decoding unit according to Embodiment 1 of the present invention.

FIG. 2 is a block diagram of the macroblock decoding unit.

The first macroblock decoding unit 404 and the second macroblock decoding unit 405 have the same structure, and each of the first macroblock decoding unit 404 and the second macroblock decoding unit 405 includes: a variable length decoding unit 500; an inverse quantization unit 501; an inverse orthogonal transformation unit 502; an intra picture prediction unit 503; a motion compensation prediction unit 504; and an adding circuit 505.

The variable length decoding unit 500 performs variable length decoding on a block group including plural macroblocks (for example, a macroblock line) to be decoded, from among the processed coded stream Stm, and outputs a prediction mode, a quantized coefficient, a motion vector, and the like. The inverse quantization unit 501 performs inverse quantization on the quantized coefficient that has been output from the variable length decoding unit 500, and outputs coefficient data to the inverse orthogonal transformation unit 502. The inverse orthogonal transformation unit 502 performs inverse orthogonal transformation on the coefficient data, and generates an error image that is pixel data of a spatial domain.

One of the intra picture prediction unit 503 or the motion compensation prediction unit 504 is activated depending on the prediction mode that has been output from the variable length decoding unit 500, and generates a prediction image that is composed of pixel data. In the case where the prediction mode is an intra prediction, the intra picture prediction unit 503 is activated and the intra picture prediction unit 503 performs intra picture prediction. In the case where the prediction mode is an inter prediction, the motion compensation prediction unit 504 is activated. In this case, the motion compensation prediction unit 504 obtains a reference image that corresponds to the decoded motion vector and performs motion compensation prediction. The adding circuit 505 adds the error image that has been output from the inverse orthogonal transformation unit 502 to the prediction image that has been output from one of the intra picture prediction unit 503 or the motion compensation prediction unit 504, thereby generating and outputting a reconstructed image that is pixel data.

Figure 3:
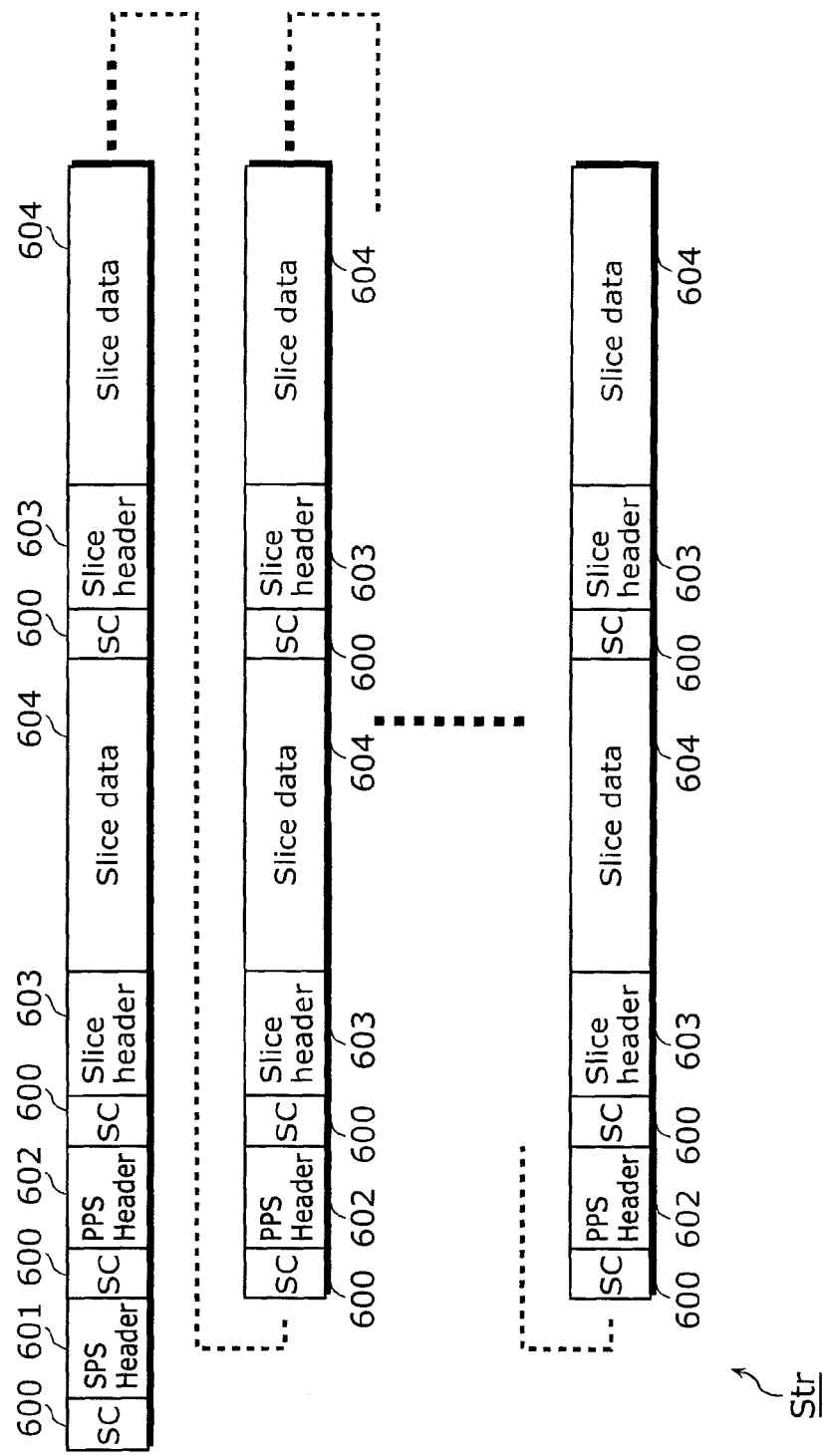
FIG. 3 is a structure diagram of a typical coded stream of H.264.

FIG. 3 is a block diagram of a typical coded stream Str according to H.264.

A sequence parameter set (SPS) header 601 is located at the beginning of the coded stream Str, and followed by a picture parameter set (PPS) header 602, a slice header 603, and slice data 604. A start code (SC) that is a delimiter of data is inserted into the beginning of the SPS header 601, the PPS header 602, and the slice header 603.

Thus, the header decoding unit 401 performs a start code search on the coded stream Str and analyzes the data following the start code 600, thereby searching the SPS header 601, the PPS header 602, or the slice header 603 in the coded stream Str. A picture includes the PPS header at the beginning thereof and string of data until the next PPS header 602 appears is the data for one picture. The data for one picture includes a set of the slice header 603 and the slice data 604 for the number of slices contained in the picture. In addition, macroblock layer data that indicates coded macroblocks is stored in the slice data 604.

The slice data predecoding unit 402 performs variable length decoding on the macroblock layer data included in the slice data 604, thereby obtaining the parameter for parallel processing described above.

Figure 4:
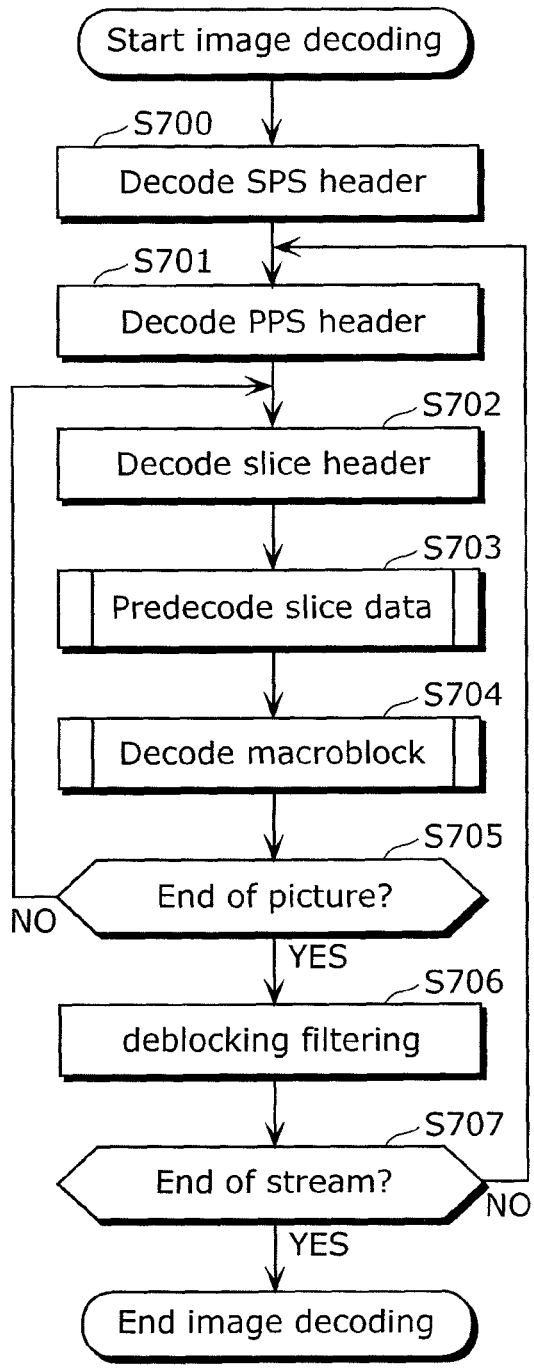
FIG. 4 is a flow chart which shows an operation of the image decoding apparatus according to Embodiment 1 of the present invention.

FIG. 4 is a flow chart that indicates an operation of the image decoding apparatus 40 according to Embodiment 1 of the present invention.

First, when a coded stream Str is received, the header decoding unit 401 decodes the SPS header 601 (Step S700), then decodes the PPS header 602 (Step S701), and then decodes the slice header 603 (Step S702). When decoding the slice header 603 is completed, the slice data predecoding unit 402 performs predecoding on the slice data 604, thereby decoding a parameter for parallel processing that is needed in advance for performing decoding processing on macroblocks in parallel, and processing the coded stream Str (Step S703).

When predecoding the slice data 604 for one slice is completed, each of the first macroblock decoding unit 404 and the second macroblock decoding unit 405 reads the macroblock to be decoded (macroblock line) according to the instruction from the decoding control unit 400, from the processed coded stream Stm that has been stored in the stream buffer 403, and decodes the macroblock in parallel (Step S 704).

Figure 5:
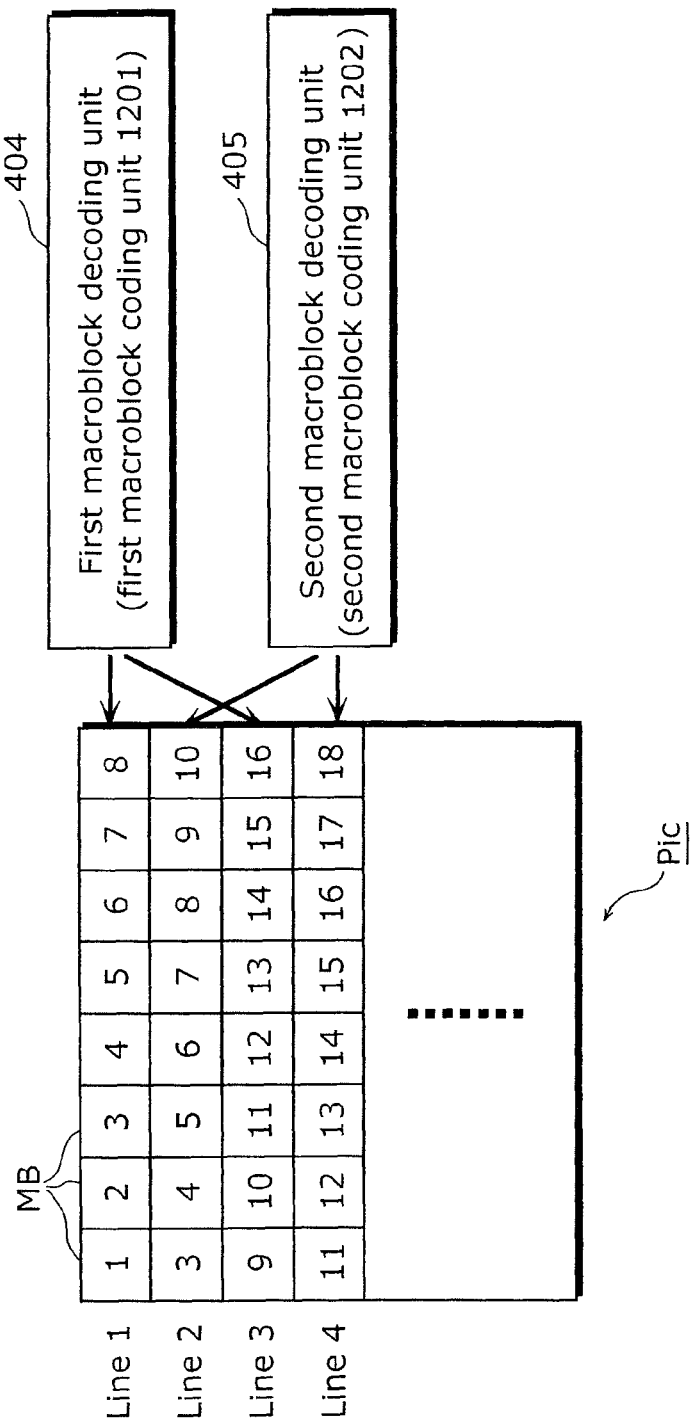
FIG. 5 is a diagram which shows an order of macroblocks to be decoded in parallel by the macroblock decoding unit according to Embodiment 1 of the present invention.

FIG. 5 is a diagram which shows an order of macroblocks to be decoded in parallel by the macroblock decoding unit.

Figure 22:
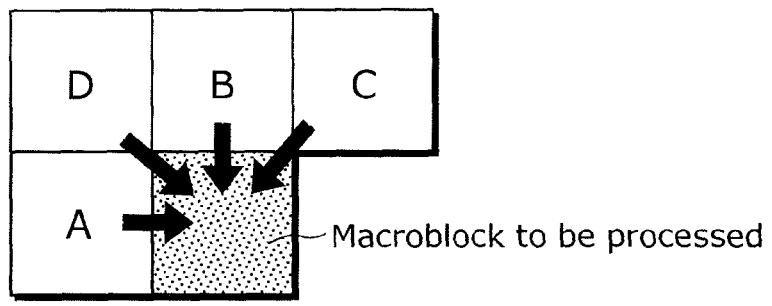
FIG. 22 is a diagram which shows a positional dependency according to H.264.
Figure 23:
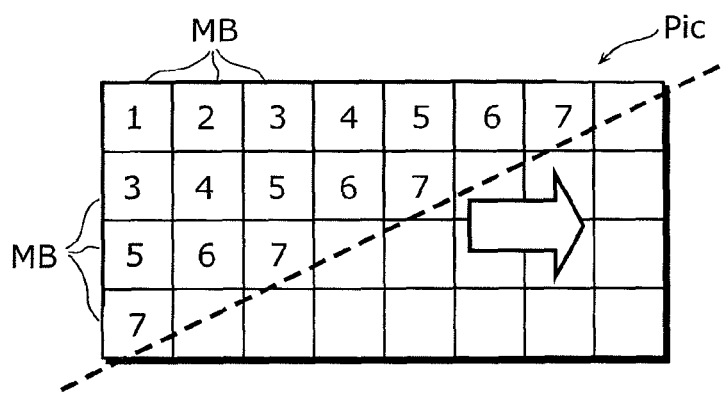
FIG. 23 is a diagram which shows a processing procedure of a conventional image decoding apparatus and a conventional image coding apparatus.

Since there is the positional dependency shown in FIG. 22 according to H.264, the image decoding apparatus 40 performs decoding in the order shown in FIG. 5. It is to be noted that, in FIG. 5, the number given to each of the macroblocks MB indicates the processing order. That means the macroblocks MB having the same number are processed concurrently in parallel.

As shown in FIG. 5, the first macroblock decoding unit 404 decodes a macroblock MB in an odd-numbered line included in a picture Pic, that is, plural macroblocks MB included in a macroblock line that is the odd-numbered block group, and the second macroblock decoding unit 405 decodes a macroblock MB in an even-numbered line included in the picture Pic, that is, plural macroblocks MB included in a macroblock line that is the even-numbered block group. Further, in the case where the first macroblock decoding unit 404 decodes a given macroblock MB, the second macroblock decoding unit 405 processes, in parallel, a macroblock MB that is located at the left side by two columns on a row under the macroblock MB. This makes it possible to perform decoding in parallel by solving the positional dependency.

The decoding control unit 400, when decoding of the macroblock for one slice is completed, determines whether or not the slice of which decoding is completed is located at the end of the picture (Step S705). The number of slices included in the picture is detected by decoding a parameter (num_slice_groups_minus1) in the PPS header 602. Thus, when the number obtained by subtracting one from the number of slices of which decoding is completed matches the parameter (num_slice_groups_minus1), the decoding control unit 400 determines that the slice of which decoding is immediately previously completed is located at the end of the picture.

Here, when it is determined that the slice is not located at the end of the picture (No in Step S705), the decoding control unit 400 instructs the header decoding unit 401, the slice data predecoding unit 402, and the macroblock decoding unit to sequentially perform, until the end of the picture, decoding of the slice header 603, (Step S702), predecoding of the slice data 604 (Step S703), and decoding of the macroblock (Step S704), respectively. On the other hand, when it is determined that the slice is located at the end of the picture (Yes in Step S705), the decoding control unit 400 instructs the deblocking filter unit 406 to perform deblocking filtering on a reconstructed image for one picture (Step S706). When the deblocking filtering is completed, the decoding control unit 400 next determines whether or not the picture on which deblocking filtering is performed is located at the end of the coded stream Str (Step S707).

Here, when it is determined that the picture is not located at the end of the coded stream Str, in other words, a stream follows (No in Step S707), the decoding control unit 400 instructs the header decoding unit 401 to decode the PPS header 602 of a picture to be decoded next (Step S701), thereby sequentially decoding pictures included in the coded stream Str.

The following describes details of predecoding the slice data 604 (Step S703 in FIG. 4).

Figure 6:
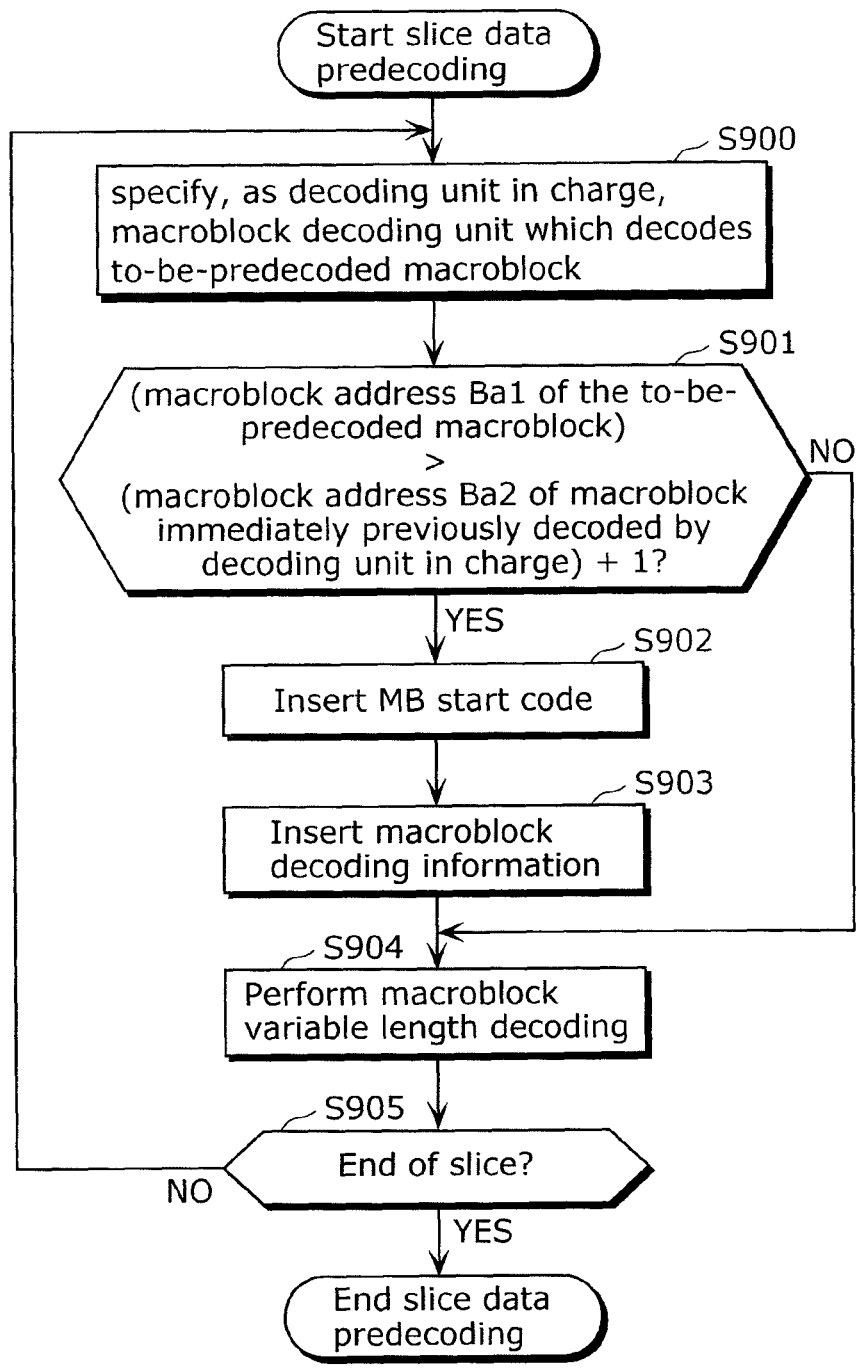
FIG. 6 is a flow chart which shows an operation of predecoding processing of the slice data according to Embodiment 1 of the present invention.

FIG. 6 is a flow chart that shows detailed operations of predecoding the slice data 604.

The slice data predecoding unit 402 performs predecoding on the slice data 604 on a macroblock basis. To be specific, the slice data predecoding unit 402 first specifies, as a decoding unit in charge, the macroblock decoding unit which decodes the macroblock MB to be predecoded (to-be-predecoded macroblock) from among the first macroblock decoding unit 404 and the second 405 (Step S900). Then the slice data predecoding unit 402 determines whether or not a macroblock address Ba1 of the to-be-predecoded macroblock MB is greater than a value obtained by adding one to a macroblock address Ba2 of the macroblock MB (immediately previously decoded macroblock) decoded immediately previously by the decoding unit in charge (Step S901).

Figure 24:
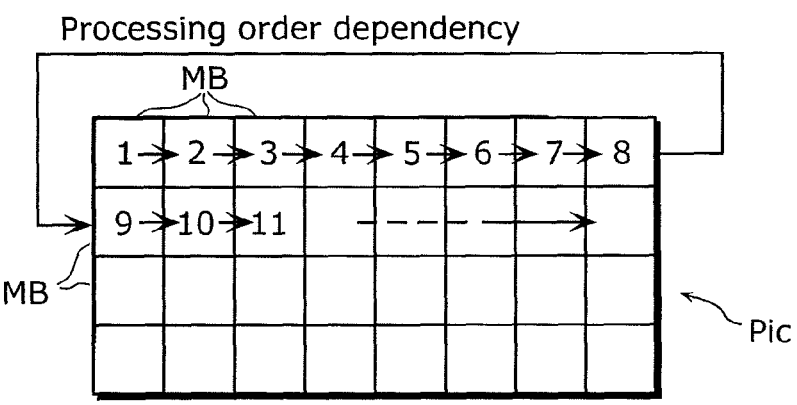
FIG. 24 is a diagram which shows a processing order dependency according to H.264.

The macroblock address is an index having a number assigned to the macroblock MB in the picture Pic in a raster scanning order as shown in FIG. 24, and the macroblock MB in the picture Pic is processed in a macroblock address order according to H.264. In the case of decoding according to the procedure shown in FIG. 5, for example, the first macroblock decoding unit 404 decodes a macroblock MB located at the left end of the picture Pic in a line 3 (the ninth macroblock MB in the line 3) subsequent to the macroblock MB located at the right end of the picture Pic in a line 1 (the eighth macroblock MB in the line 1). In this case, all of the macroblocks MB on the line 2 between the eighth macroblock MB and the ninth macroblock MB are not decoded by the first macroblock decoding unit 404 and are excluded from the target to be decoded. Thus, the macroblock address Ba1 of the above-mentioned to-be-predecoded macroblock MB (the ninth macroblock MB in the line 3) becomes greater than a value obtained by adding one to the macroblock address Ba2 of the immediately previously decoded macroblock MB (the eighth macroblock MB in the line 1). Likewise, the second macroblock decoding unit 405 decodes a macroblock MB (the eleventh macroblock MB in the line 4) located at the left end of the picture Pic in a line 4 subsequent to a macroblock MB (the tenth macroblock MB in the line 2) located at the right end of the picture Pic in the line 2. In this case, all of the macroblocks MB on the line 3 between the tenth macroblock MB and the eleventh macroblock MB are not decoded by the second macroblock decoding unit 405 and are excluded from the target to be decoded. Thus, the macroblock address Ba1 of the above-mentioned to-be-predecoded macroblock MB (the eleventh macroblock MB in the line 4) becomes greater than a value obtained by adding one to the macroblock address Ba2 of the immediately previously decoded macroblock MB (the tenth macroblock MB in the line 2).

As described above, in Step S901, the slice data predecoding unit 402 determines whether or not the to-be-predecoded macroblock MB is a macroblock MB located at the beginning of a macroblock group which is decoded by the decoding unit in charge and has consecutive macroblock addresses. To put it differently, in the case where decoding is carried out by the procedure as shown in FIG. 5, the slice data predecoding unit 402, in Step S901, determines as true (YES) when the macroblock MB located at the left end of the picture Pic is predecoded.

When the determination result is false (NO) in Step S901, the slice data predecoding unit 402 performs conventional variable length decoding for the macroblock MB to find the beginning of the next macroblock MB (Step S904). On the other hand, when the determination result is true (Yes) in Step S901, the slice data predecoding unit 402 inserts a macroblock (MB) start code that is a bit pattern indicating the beginning of a to-be-predecoded macroblock MB at the position that is the beginning of the to-be-predecoded macroblock MB in the coded stream Str (Step S902). According to the preset embodiment, the MB start code is, for example, 0x000001F0. After the MB start code is inserted, the slice data predecoding unit 402 embeds, as macroblock decoding information, a parameter for parallel processing which is needed in advance for performing decoding in parallel on the to-be-predecoded macroblock, immediately subsequent to the MB start code (immediately before the to-be-predecoded macroblock MB) in the coded stream Str (Step S903). It is to be noted that the MB start code may be any value as long as it is a unique value and does not overlap with other codes.

The macroblock decoding information to be embedded is a parameter which has the processing order dependency and is generated by performing variable length decoding on the macroblock MB (immediately previous macroblock MB) located immediately previous to the macroblock address of the to-be-predecoded macroblock MB. According to H.264, in the case where the variable length coding system is context-based adaptive variable length coding (CAVLC), the slice data predecoding unit 402 embeds the quantization parameter (QP_PREV) of the immediately previous macroblock MB and the number of the macroblocks to be skipped (num_skipped_mb) as macroblock decoding information. Hereinafter, the macroblock to be skipped is called a skip macroblock and the number of the skip macroblocks is called skip macroblock number. The skip macroblock number (num_skipped_mb) indicates, when the macroblock MB at the beginning is the skip macroblock, how many skip macroblocks continue including the macroblock MB at the beginning, and becomes 0 when the macroblock MB at the beginning is not the skip macroblock. It is to be noted that the slice data predecoding unit 402 obtains a skip-run parameter (mb_skip_run) indicating the number of the skip macroblocks following the immediately previous macroblock MB including the immediately previous macroblock MB, by performing variable length decoding on the immediately previous macroblock MB. The slice data predecoding unit 402 calculates the above-mentioned skip macroblock number (num_skipped_mb) based on the skip-run parameter (mb_skip_run) and the macroblock address of the immediately previous macroblock MB.

In the case where the variable length coding system is context-base adaptive binary arithmetic coding (CABAC), the slice data predecoding unit embeds, as the macroblock decoding information, the quantization parameter (QP_PREV) of the immediately previous macroblock MB and the information (codIOffset, codIRange, valMPS, pStateIdx) indicating a inside status of the slice data predecoding unit 402 (variable length decoding unit) when variable length decoding is performed on the immediately previous macroblock MB according to CABAC. Although the inside status of the variable length decoding unit of CABAC is not syntax, since the inside status changes on each decoding of 1-bit according to CABAC, when starting decoding from the middle of the macroblock MB, the inside status until the middle of the macroblock MB is needed. Thus, it is necessary to embed, as the macroblock decoding information, the information indicating the inside status when performing variable length decoding on the immediately previous macroblock MB, into the coded stream Str.

It is to be noted that, when arithmetic decoding, of variable length decoding processing of CABAC (the arithmetic decoding processing and value multiplexing processing) is performed, the inside status changes every time 1 bit is decoded. Thus, the slice data predecoding unit 402 may perform only the arithmetic decoding processing and decode the slice data 604 into binarized data. In the case where only the arithmetic decoding processing is performed, only the quantization parameter (QP_PREV) needs to be embedded into the coded stream Str as the macroblock decoding information.

According to the present embodiment, the slice data predecoding unit 402 embeds the macroblock decoding information by coding in an exp-Golomb coding system. It is to be noted that the coding system of the macroblock decoding information may be any coding system as long as a parameter indicated by the macroblock decoding information can be uniquely decoded. In addition, the slice data predecoding unit 402 may embed the quantization parameter (QP_PREV) without change as the macroblock decoding information, and may embed a difference between a given value and the quantization parameter (QP_PREV) as the macroblock decoding information. This makes it possible to reduce the amount of data of the macroblock decoding information. The slice data predecoding unit 402, for example, embeds, as the macroblock decoding information, a difference between the quantization parameter of the immediately previous macroblock MB (QP_PREV) and an initial value (SliceQP) of the quantization parameter QP used for all of the macroblocks MB in the slice including a current macroblock MB. It is to be noted that the initial value described above (SliceQP) can be calculated from the parameter included in the slice header 603.

When the inserting process of the macroblock decoding information (Step S903) has been completed, the slice data predecoding unit 402 next performs variable length decoding on the to-be-predecoded macroblock in order to find the beginning of the next macroblock MB (Step S904). Next, the slice data predecoding unit 402 determines whether or not the to-be-predecoded macroblock MB on which variable length decoding has been performed in Step S904 is a macroblock MB located at the end of a slice (Step S905). Here, the slice data predecoding unit 402 determines the to-be-predecoded macroblock MB as not being the macroblock MB located at the end of a slice (No in Step S905), the slice data predecoding unit 402 predecodes the slice data 604 by repeatedly performing processes starting from Step S900 on the next to-be-predecoded macroblock MB.

As stated above, the slice data predecoding unit 402 according to the present embodiment performs variable length decoding (predecoding) as part of the decoding processing, for each macroblock line including plural blocks in the coded stream Str, on the macroblock line, thereby generating the macroblock decoding information that is a parameter necessary for decoding other macroblock lines. Then predecoding as described above is performed on each slice data 604 included in the coded stream Str, so that the processed coded stream Stm is generated and stored into the stream buffer 403.

Figure 7:
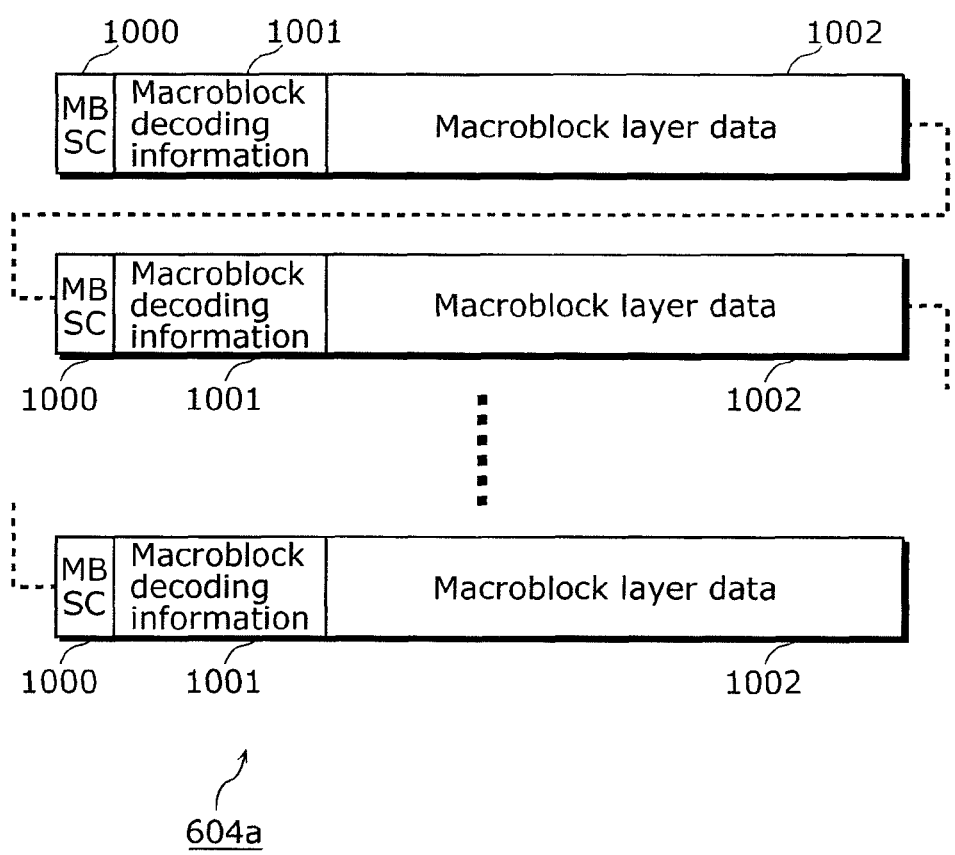
FIG. 7 is a structure diagram of slice data of a processed coded stream according to Embodiment 1 of the present invention.

FIG. 7 is a diagram which shows a structure of slice data in the processed coded stream Stm.

Slice data 604a of the processed coded stream Stm, that is, a slice data 604a obtained by predecoding the slice data 604 of one slice includes one or plural data sets including MB start code 1000, macroblock decoding information 1001, and macroblock layer data 1002. The macroblock layer data 1002 is exactly the same data as included in the slice data 604 of the coded stream Str. That means the macroblock layer data 1002 is data on which decoding processing has not been performed at all. The number of data sets included in the slice data 604a is the same as the number of determination resulting as true (YES) in Step S901 when predecoding the slice data 604.

It is to be noted that the macroblock layer data 1002 included in the data set includes a macroblock MB on which variable length decoding has not been performed, that is, a macroblock MB in a state where variable length coding has been performed.

In addition, in the case where the system of variable length coding is CABAC, when the slice data 604 is decoded into binarized data in the predecoding of the slice data 604 (Step S703), the decoded binarized data is included instead of the macroblock layer data 1002.

It is to be noted that although the MB start code and the macroblock decoding information 1001 are inserted at the beginning of the to-be-predecoded macroblock that has been determined as true (YES) in Step S901, the MB start code 1000 and the macroblock decoding information 1001 may be insert also into the macroblock MB other than the to-be-predecoded macroblock MB. The MB start code 1000 and the macroblock decoding information 1001 may be inserted at the beginning of all of the macroblocks MB, for example. When the MB start code 1000 and the macroblock decoding information 1001 are inserted at the beginning of all of the macroblocks MB, whichever macroblock MB can be allocated, in the decoding processing of the macroblock MB (Step S704), to any macroblock decoding units to solve the processing order dependency in the decoding.

Figure 8:
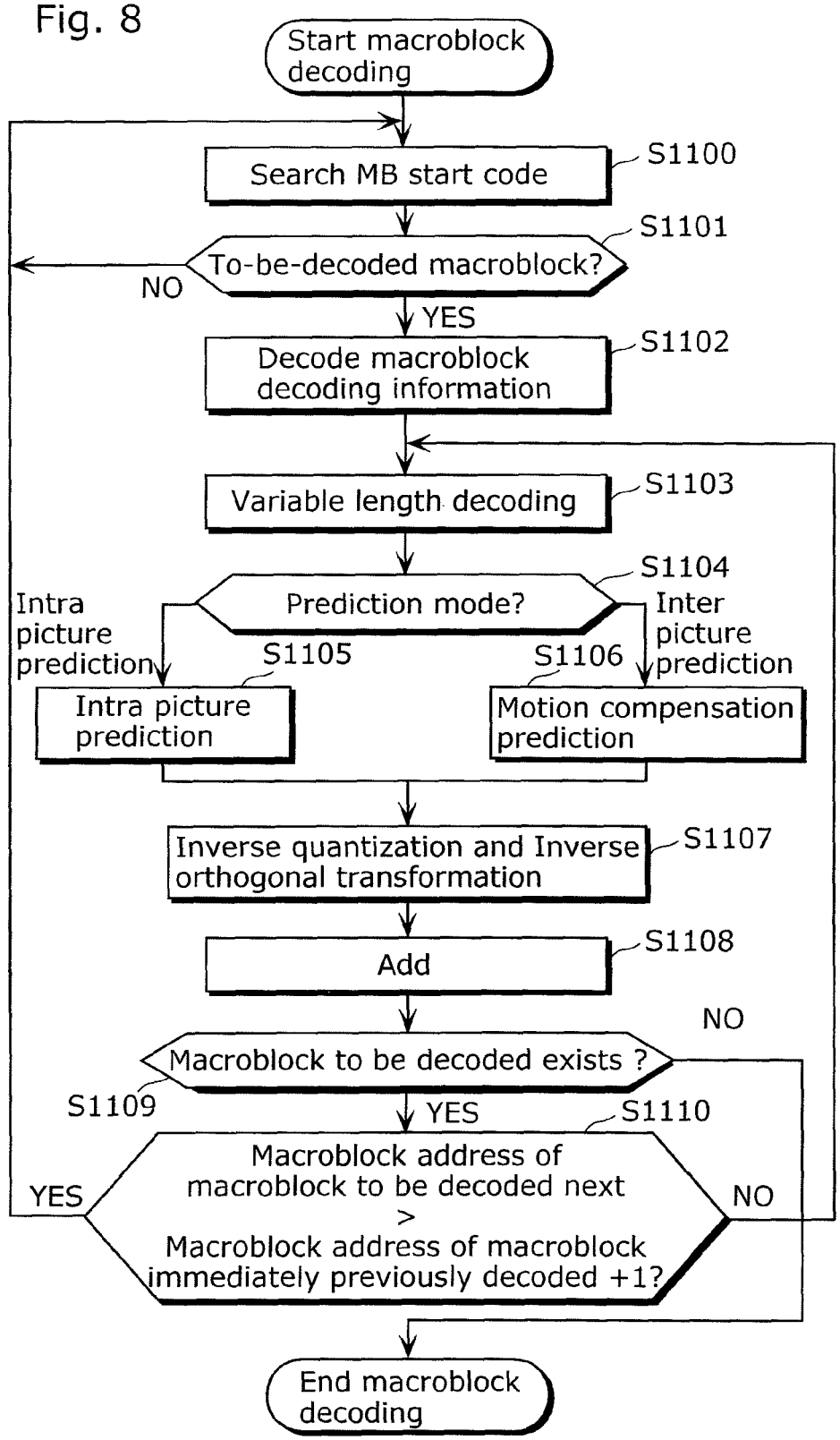
FIG. 8 is a flow chart showing decoding processing performed by the macroblock decoding unit according to Embodiment 1 of the present invention.

The following described details of the decoding processing of a macroblock MB as shown in FIG. 4 (Step S704) with reference to FIG. 8.

FIG. 8 is a flow chart which shows the decoding processing of a macroblock MB performed by the macroblock decoding unit.

First, the macroblock decoding unit searches the processed coded stream Stm for the MB start code 1000, and goes on reading the processed coded stream Stm until the MB start code 1000 is found (Step S1100). Next, the macroblock decoding unit determines whether or not the macroblock MB to which the MB start code 1000 is attached is a to-be-decoded macroblock MB that is allocated to the macroblock decoding unit (Step S1101). At this time, when the macroblock decoding unit determines that it is not the to-be-decoded macroblock MB allocated to the macroblock decoding unit, (NO in Step S1101), the macroblock decoding unit repeats the searching of the MB start code until the to-be-decoded macroblock MB appears (Step S1100). On the other hand, when the macroblock decoding unit determines that it is the to-be-decoded macroblock MB allocated to the macroblock decoding unit, (YES in Step S1101), the macroblock decoding unit decodes the macroblock decoding information 1001 following the MB start code 1000 (Step S1102). After that, the macroblock decoding unit performs usual decoding processing on the macroblock MB. It is to be noted that the processing of the MB start code searching (Step S1100), determination of the to-be-decoded macroblock MB (Step S1101), and decoding of the macroblock decoding information (Step S1102) is all carried out in the variable length decoding unit 500.

Next, the variable length decoding unit 500 in the macroblock decoding unit performs variable length decoding on the to-be-decoded macroblock MB allocated to the macroblock decoding unit (Step S1103). Here, in the case where the to-be-decoded macroblock MB is the macroblock MB which has the MB start code 1000 and is the first macroblock MB (the macroblock MB immediately after the macroblock decoding information), the variable length decoding unit 500 uses the macroblock decoding information 1001 decoded in Step S1002 to perform variable length decoding on the first macroblock MB. Next, the macroblock decoding unit determines a prediction mode as an intra picture prediction or an inter picture prediction, using the result of the variable length decoding (Step S1104). When the prediction mode is determined as the intra picture prediction (the intra picture prediction in Step S1104), the intra picture prediction unit 503 is activated and performs the intra picture prediction processing (Step S1105). When the prediction mode is determined as the inter picture prediction (the inter picture prediction in Step S1104), the motion compensation prediction unit 504 is activated and performs the motion compensation prediction processing (Step S1106). A prediction image that is pixel data is generated thorough the processing of Step S1105 and Step S1106.

Next, the macroblock decoding unit performs inverse quantization, in the inverse quantization unit 501, on a quantized coefficient on which variable length decoding processing (Step S1103) has been performed, and performs inverse orthogonal transformation in the inverse orthogonal transformation unit 502, thereby generating an error image with respect to the prediction image (Step S1107). Lastly, the macroblock decoding unit adds the prediction image to the error image, thereby obtaining a reconstructed image that is pixel data (Step S1108). When the decoding processing for one macroblock MB is completed as described above, the macroblock decoding unit determines whether or not macroblock layer data 1002 to be decoded exists (Step S1109). When the macroblock decoding unit determines that the macroblock layer data 1002 to be decoded does not exist (NO in Step S1109), the macroblock decoding unit ends the decoding processing on the macroblock MB. On the other hand, when the macroblock decoding unit determines that the macroblock layer data 1002 to be decoded remains (YES in Step S1109), the macroblock decoding unit determines whether or not a macroblock address of a macroblock to be decoded next is greater than a value obtained by adding one to the macroblock address of the macroblock MB which has been immediately previously decoded (Step S1110). When the result of the determination is true (YES in Step S1110), the macroblock decoding unit searches the MB start code for searching the beginning of the macroblock MB to be decoded next (Step S1110). When the result of the determination is false (NO in Step S1110), the macroblock decoding unit performs variable length decoding on the macroblock MB to be decoded next (Step S1103).

According to the present embodiment as described above, by performing predecoding to generate the macroblock decoding information 1001 in advance, two macroblock decoding units can solve the processing order dependency existing in the new coding system represented by H.264 and perform decoding processing in parallel, making it possible to perform decoding at high speed. In addition, in the present embodiment, each of the two macroblock decoding units performs, not the remaining processes other than the variable length decoding among decoding processes on a predecoded macroblock line, but the all of the decoding processes on a macroblock line included in the coded stream Str, eliminating the need to generate a decoded stream which has plural predecoded macroblock lines and on which variable length decoding has been completely performed. The decoded stream on which variable length decoding has been completely performed has a greater amount of data than that of the original coded stream Str. Thus, according to the present embodiment, since two macroblock decoding units perform all of the decoding processes on the macroblock line included in the original coded stream Str, it is possible to reduce the capacity of the stream buffer 403 in which a stream to be decoded is temporarily stored.

It is to be noted that the macroblock decoding information 1001 that is a parameter for parallel processing is embedded in the coded stream Str in the present embodiment. It is only necessary, however, to provide the first macroblock decoding unit 404 or the second macroblock decoding unit 405 with the macroblock decoding information 1001 when decoding a macroblock MB, and thus, the macroblock decoding information 1001 does not necessarily have to be embedded in the coded stream Str. For example, the slice data predecoding unit 402, instead of embedding the macroblock decoding information 1001 in the coded stream Str, may provide the decoding control unit 400 with the macroblock decoding information 1001 after predecoding on the slice data 604 is completed, and the decoding control unit 400 may notify the macroblock decoding unit of the macroblock decoding information 1001 when macroblock decoding unit is activated.

Further, in the present embodiment, the number of macroblocks to be skipped (num_skipped_mb) is embedded in the coded stream Str as the macroblock decoding information 1001. However, the skip-run parameter (mb_skip_run) may be embedded in the coded stream Str as the macroblock decoding information 1001, instead.

Furthermore, in the present embodiment, two macroblock decoding units are used to decode macroblocks in parallel. However, the number of macroblock decoding units is not limited to two. The Patent Literature 1 discloses the method for decoding macroblocks in parallel using more than two macroblock decoding units. According to the method, decoding can be carried out by using more than two macroblock decoding units.

Furthermore, in the present embodiment, a part or all of the decoding control unit 400, the header decoding unit 401, the slice data predecoding unit 402, the stream buffer 403, the first macroblock decoding unit 404, the second macroblock decoding unit 405, the deblocking filter unit 406, and the reference image memory 407 may be mounted on a single integrated circuit, may be implemented as plural integrated circuits mounted on a single circuit board, or may be implemented as an independent apparatus connected via a network or a bus.

It is to be noted that, in the present embodiment, an image decoding apparatus that corresponds to the general H.264 coding system has been described. However, it is possible to omit predecoding in the slice data predecoding unit 402 (Step S703) as long as the image has been coded with restriction on a part of H.264 coding system. This is because the predecoding is performed in order to solve the processing order dependency, and thus the decoding processing (Step S704) can be performed without performing predecoding when the processing order dependency does not exist. More specifically, for standardizing an image coding system suited to the parallel decoding processing, it is only necessary to add restriction to an existing image coding system so as to eliminate the processing order dependency. In the case of devising a new image coding system suited to the parallel decoding processing based on H.264 coding system, for example, a system to code the value of a quantization parameter QP without change or system to code only the difference value from the initial value (SliceQP) of the quantization parameter QP, instead of coding the difference value (mb_qp_delta), are conceived. In addition, a system to code the skip-run parameter (mb_skip_run) always into 0 is conceived as well. Further, a system to prohibit use of CABAC and perform variable length coding in CAVLC only is also be conceived.

Embodiment 2

Figure 9:
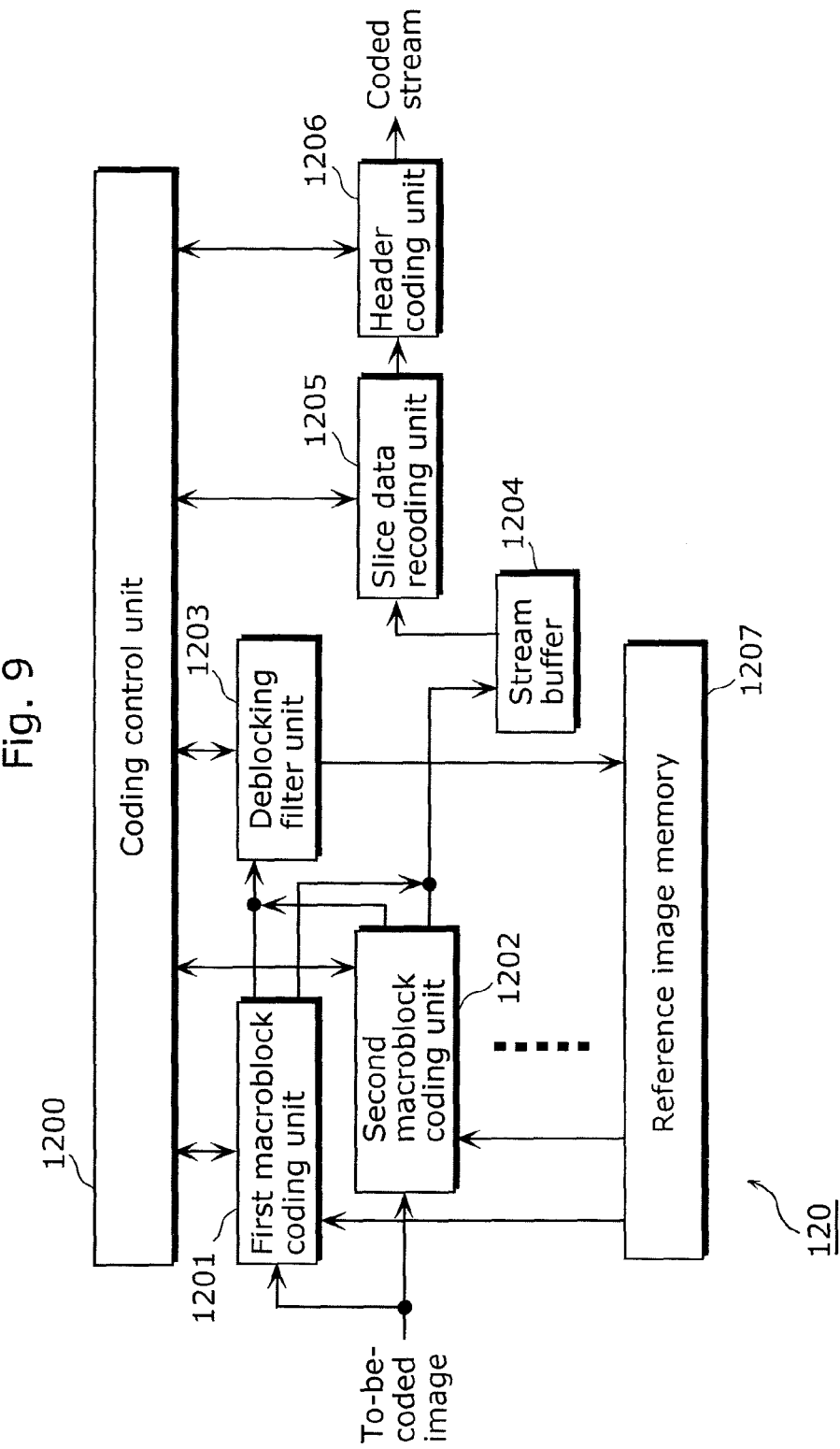
FIG. 9 is a block diagram of an image coding apparatus according to Embodiment 2 of the present invention.

FIG. 9 is a block diagram of an image coding apparatus according to Embodiment 2 of the present invention.

As shown in FIG. 9, an image coding apparatus 120 includes: a coding control unit 1200; a first macroblock coding unit 1201; a second macroblock coding unit 1202; a deblocking filter unit 1203; a stream buffer 1204; a slice data recoding unit 1205; a header coding unit 1206; and a reference image memory 1207. It is to be noted that the first macroblock coding unit 1201 and the second macroblock coding unit 1202 are collectively called a macroblock decoding unit when distinction is not necessary.

The following describes an operation of each component of the image coding apparatus 120 as shown in FIG. 9.

The first macroblock coding unit 1201 and the second macroblock coding unit 1202 perform coding processing in parallel on a macroblock basis when obtaining a to-be-coded image that is pixel data. Then the first macroblock coding unit 1201 and the second macroblock coding unit 1202 outputs, to the deblocking filter unit 1203, a reconstructed image that is pixel data and is generated by reconstructing the image coded in the coding processing. Further, the first macroblock coding unit 1201 and the second macroblock coding unit 1202 output, to the stream buffer 1204, an intermediate stream of the image which has been coded in the coding processing described above. At this time, the first macroblock coding unit 1201 and the second macroblock coding unit 1202 read a reference image which is pixel data and used for motion compensation, from the reference image memory 1207 as necessary.

The stream buffer 1204 temporarily holds the intermediate stream that has been output from each of the macroblock coding units. It is to be noted that the plural fragmentary intermediate streams that have been output from the macroblock coding units are handled as a single combined intermediate stream by being stored in the stream buffer 1204. Further, the intermediate stream is a stream generated by coding macroblocks MB in parallel by two macroblock coding unit, and thus the processing order dependency described above is not satisfied in a picture included in the intermediate stream. Therefore, the intermediate stream, due to a portion that cannot be coded, is a stream that has not yet been coded completely.

The deblocking filter unit 1203 performs deblocking filtering for removing a block noise on the reconstructed image, and outputs the resultant decoded image to the reference image memory 1207. The reference image memory 1207 holds the decoded image that has been output from the deblocking filter unit 1203 to be used as the reference image described above.

The slice data recoding unit 1205 reads the intermediate stream from the stream buffer 1204 and performs recoding processing on the intermediate stream. The header coding unit 1206 codes a header, generates a final coded stream by combining the recoded stream that has been output from the slice data recoding unit 1205 and the coded header, and outputs the final coded stream. It is to be noted that, in the present embodiment, the slice data recoding unit 1205 is configured as an adjusting unit, and the slice data recoding unit 1205 adjusts a parameter which is used for coding and included in the intermediate stream generated by two macroblock coding units, thereby matching the intermediate stream with the coded stream generated by sequentially coding the plural macroblock lines included in the picture in a predetermined processing order.

The coding control unit 1200 controls the first macroblock coding unit 1201, the second macroblock coding unit 1202, the deblocking filter unit 1203, the slice data recoding unit 1205, and the header coding unit 1206, thereby controlling the entire image coding processing and, for example, instructing the components to start processing.

Figure 10:
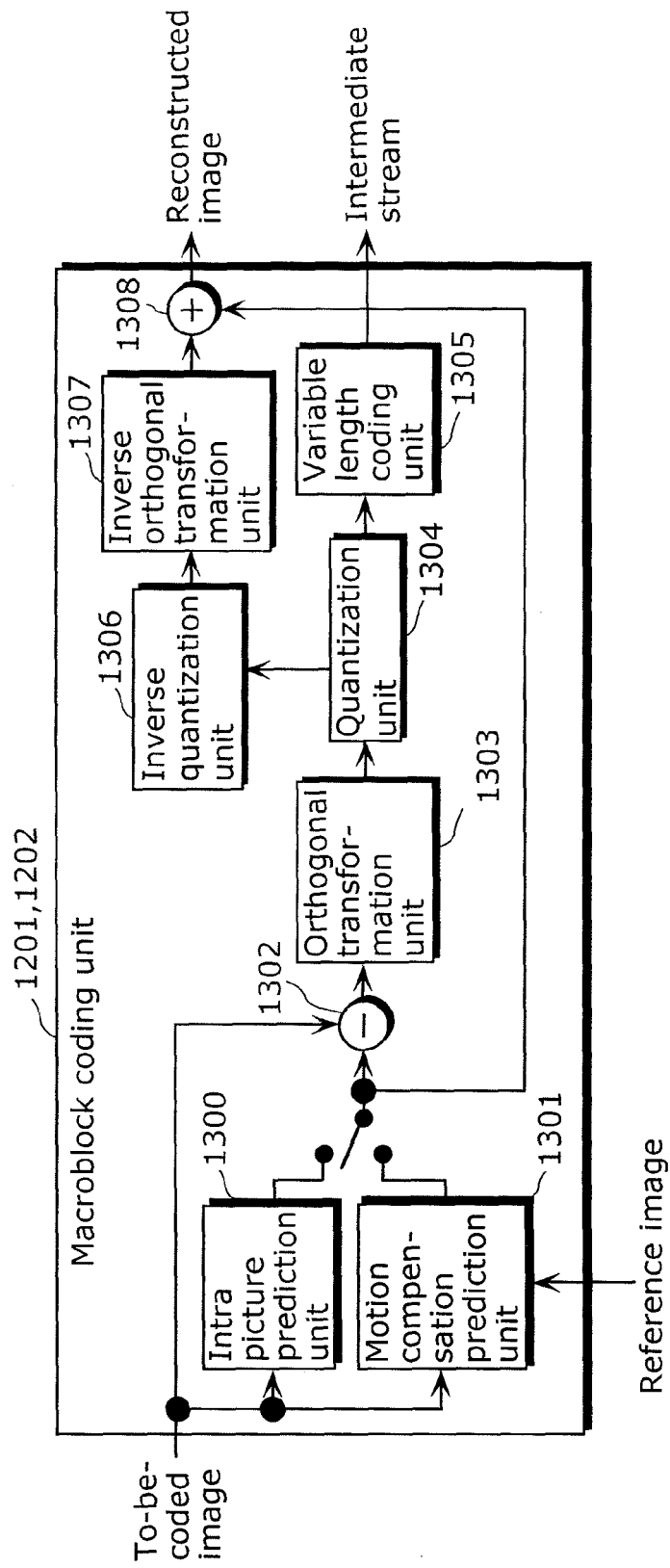
FIG. 10 is a block diagram of a macroblock coding unit according to Embodiment 2 of the present invention.

FIG. 10 is a block diagram of a macroblock coding unit.

The first macroblock coding unit 1201 and the second macroblock coding unit 1202 have the same structure, each of which includes: an intra picture prediction unit 1300, a motion compensation prediction unit 1301, a subtracting circuit 1302, an orthogonal transformation unit 1303, a quantization unit 1304, a variable length coding unit 1305, an inverse quantization unit 1306, an inverse orthogonal transformation unit 1307, and an adding circuit 1308. First, when a macroblock MB which is included in a to-be-coded image and is pixel data is input to the macroblock coding unit, the coding control unit 1200 specifies a prediction mode, thereby activating one of the intra picture prediction unit 1300 or the motion compensation prediction unit 1301. The intra picture prediction unit 1300 is activated to perform intra picture prediction when the prediction mode is the intra picture prediction, thereby generating and outputting a prediction image that is pixel data and corresponds to the to-be-coded macroblock MB described above. The motion compensation prediction unit 1301 is activated to obtain a reference image corresponding to a motion vector and perform motion compensation prediction when the prediction mode is the inter picture prediction, thereby generating and outputting a prediction image that is pixel data and corresponds to the to-be-coded macroblock MB described above.

The subtracting circuit 1302 subtracts the prediction image from the to-be-coded macroblock MB described above, thereby generating an error image that is pixel data in a spatial domain. The orthogonal transformation unit 1303 performs orthogonal transformation on the error image, thereby transforming the error image into a coefficient. The quantization unit 1304 quantizes the coefficient. The variable length coding unit 1305 performs variable length coding on the quantized coefficient, prediction mode, and the like, thereby generating and outputting the intermediate stream described above.

The inverse quantization unit 1306 performs inverse quantization on the quantized coefficient. The inverse orthogonal transformation unit 1307 performs inverse orthogonal transformation on the inversely quantized coefficient, thereby reconstructing the coefficient to be an error image. The adding circuit 1308 adds the error image to the prediction image that has been output from the intra picture prediction unit 1300 or the motion compensation prediction unit 1301, thereby generating and outputting a reconstructed image.

Figure 11:
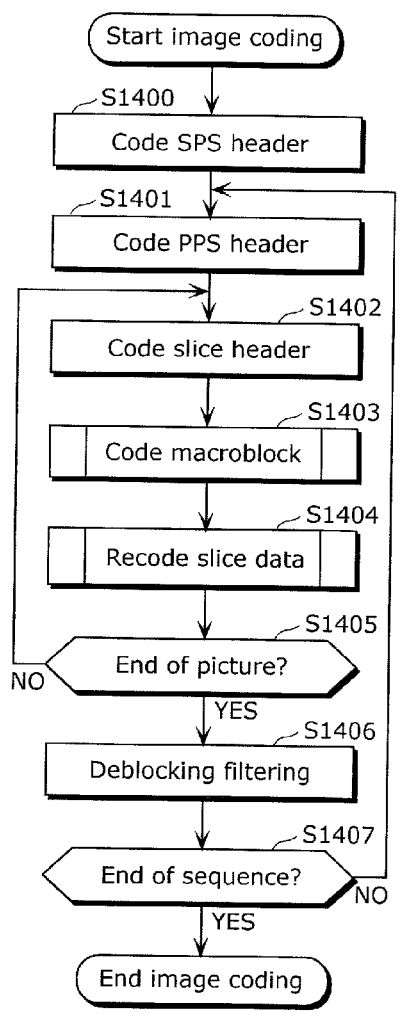
FIG. 11 is a flow chart which shows an operation of the image coding apparatus according to Embodiment 2 of the present invention.

FIG. 11 is a flow chart that indicates an operation of the image decoding apparatus 120 according to Embodiment 2 of the present invention.

First, the header coding unit 1206 sequentially performs coding on the SPS header 601 (Step S1400), coding on the PPS header 602 (Step S1401), and coding on the slice header 603 (Step S1402). When the coding on the slice header 603 (Step S1402) is completed, the first macroblock coding unit 1201 and the second macroblock coding unit 1202 performs coding in parallel on the to-be-coded image on a macroblock basis according to the instruction from the coding control unit 1200 (Step S1403). According to H.264, since the positional dependency as shown in FIG. 22 exists, two macroblock coding units perform parallel coding by the procedure as shown in FIG. 5 in the same manner as decoding. The details are the same as in the case of decoding, and thus description will be omitted. It is to be noted that, in the variable length coding (Step S1507 described later) in the coding of the macroblock MB (Step S1403), the processing order dependency described above is not satisfied because coding of the macroblocks MB is performed in parallel. Thus, since an intermediate stream generated in the coding processing includes a portion that can not be completely coded, the macroblock coding unit carries out only a necessary portion of the processing of variable length coding when performing the variable length coding on the macroblock MB, and generates the intermediate stream.

The slice data recoding unit 1205, when completing the coding processing on the macroblock MB for one slice (Step S1403), performs recoding processing on the portion of the slice data which has not been coded completely in the coding processing (Step S1403) on the macroblock MB (Step S1404). The coding control unit 1200, when recoding processing on the slice data (Step S1404) has been completed, determines whether or not the position at which the recoding processing has been completed in the intermediate stream is the end of the picture (Step S1405). The coding control unit 1200, when determining that it is not the end of the picture (NO in Step S1405), instructs each of the components to perform processing on the slice to be coded next, which includes: coding the slice header (Step S1402); coding the macroblock MB (Step S1403); and recoding the slice data (Step S1404), and to repeat each of the processes described above until the position at which recoding is completed in the intermediate stream becomes the end of the picture.

On the other hand, the coding control unit 1200, when determining that the above-described position is the of the picture (YES in Step S1405), instructs the deblocking filter unit 1203 to perform deblocking filtering on the reconstructed image for one picture (Step S1406). When the deblocking filtering (Step S1406) is completed, the coding control unit 1200 determines whether or not the picture on which deblocking filtering has been performed is located at the end of a sequence (Step S1407). The coding control unit 1200, when determining that it is not located at the end of the sequence (NO in Step S1407), that is, the case where a picture to be coded follows, instructs each of the components to perform again the process such as coding the PPS header 602 (Step S1400), thereby coding a to-be-coded image for one sequence.

Figure 12:
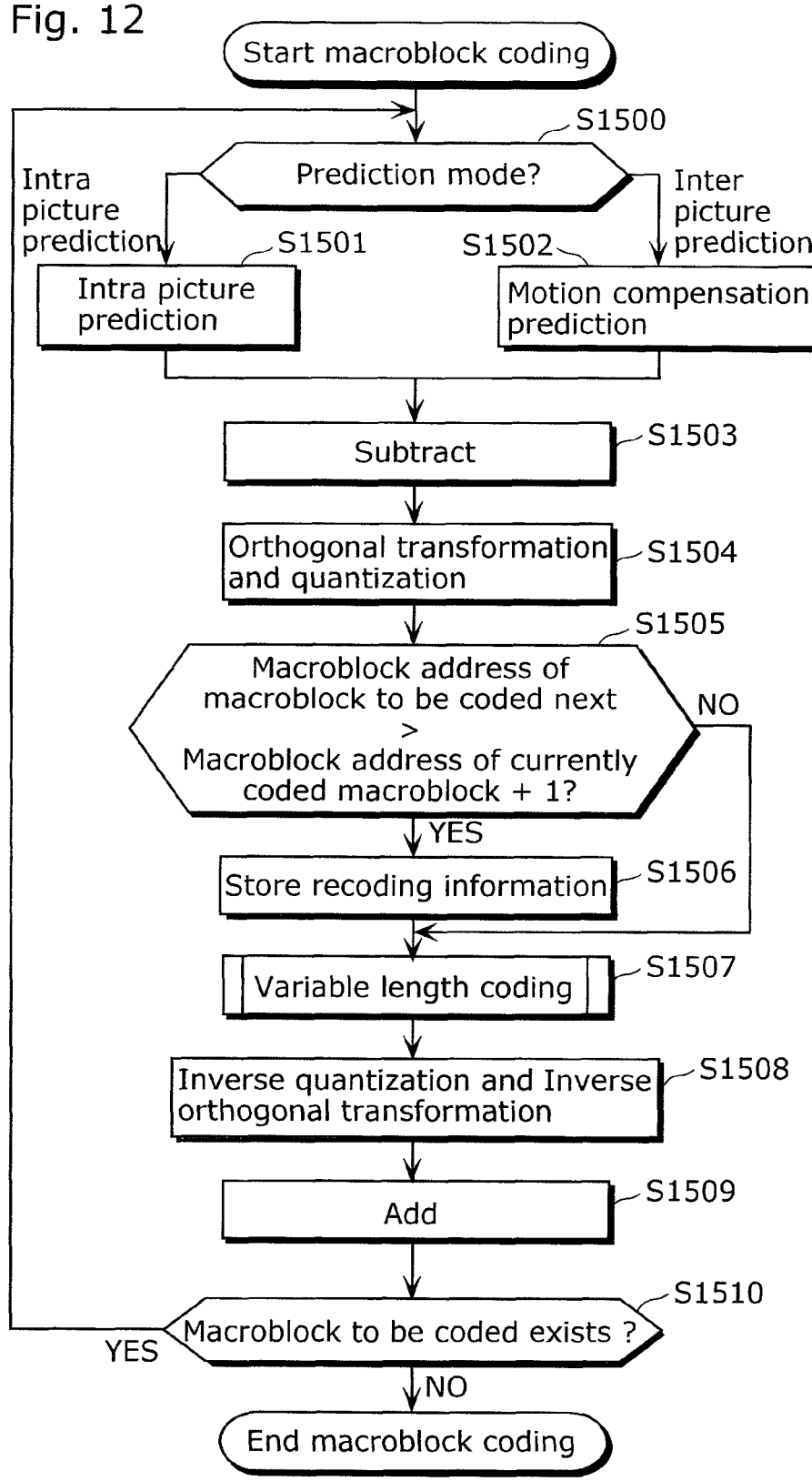
FIG. 12 is a flow chart which shows coding processing performed by the macroblock coding unit according to Embodiment 2 of the present invention.

The following described in detail the coding processing of the macroblock MB (Step S1403) as shown in FIG. 11 with reference to FIG. 12.

FIG. 12 is a flow chart which shows coding processing performed by the macroblock coding unit.

First, the intra picture prediction unit 1300 and the motion compensation prediction unit 1301 determines that the prediction mode specified by the coding control unit 120 is the intra picture prediction or the inter picture prediction (Step S1500). When the prediction mode is the intra picture prediction, the intra picture prediction unit 1300 is activated and performs the intra picture prediction (Step S1501), and when the prediction mode is the inter picture prediction, the motion compensation prediction unit 1301 is activated and performs the motion compensation prediction (Step S1502). With this, a prediction image is generated. Next, the subtracting circuit 1302 subtracts the prediction image from the to-be-coded macroblock MB and generates an error image with respect to the prediction image (Step S1503). The orthogonal transformation unit 1303 and the quantization unit 1304 perform orthogonal transformation on the error image and then perform quantization (Step S1504).

Here, the macroblock coding unit determines whether or not a macroblock address of a macroblock MB which is expected to be coded next (a next macroblock) is greater than a value obtained by adding one to a macroblock address of the macroblock which is currently coded (Step S1505). In the case where coding is carried out by the procedure as shown in FIG. 5, for example, the first macroblock coding unit 1201 codes a macroblock MB located at the left end of the picture Pic on a line 3 (the ninth macroblock MB in the line 3) subsequent to the macroblock MB located at the right end of the picture Pic on a line 1 (the eighth macroblock MB in the line 1). At this time, all of the macroblocks MB on the line 2 between the eighth macroblock MB and the ninth macroblock MB are not coded by the first macroblock coding unit 1201 and are excluded from the target of coding. Thus, the macroblock address of the next macroblock MB (the ninth macroblock MB on the line 3) becomes greater than a value obtained by adding one to the macroblock address of the to-be-coded macroblock MB (the eighth macroblock MB on the line 1).

Likewise, the second macroblock coding unit 1202 codes a macroblock MB located at the left end of the picture Pic on a line 4 (the eleventh macroblock MB in the line 4) subsequent to the macroblock MB located at the right end of the picture Pic on a line 2 (the tenth macroblock MB in the line 2). At this time, all of the macroblocks MB on the line 3 between the tenth macroblock MB and the eleventh macroblock MB are not coded by the second macroblock coding unit 1202 and are excluded from the target of coding. Thus, the macroblock address of the next macroblock MB (the eleventh macroblock MB on the line 4) becomes greater than a value obtained by adding one to the macroblock address of the to-be-coded macroblock MB (the tenth macroblock MB on the line 2).

As described above, in Step S1505, the macroblock coding unit determines whether or not the to-be-coded macroblock MB is a macroblock MB located at the end of a macroblock group which is coded by the macroblock coding unit and has consecutive macroblock addresses. More specifically, in the case where coding is carried out by the procedure as shown in FIG. 5, the macroblock coding unit, in Step S1505, determines as true (YES) when the macroblock MB located at the right end of the picture Pic is coded.

When the determination result is true (YES) in Step S1505, the macroblock coding unit stores, as recoding information (stored parameter), a quantization parameter QP of the to-be-coded macroblock MB so that the quantization parameter QP is used in the slice data recoding unit 1205 (Step S1506). At this time, the macroblock coding unit transmits the stored recoding information to the coding control unit 1200. It is to be noted that, the determination processing in Step S1505 and the storing processing in Step S1506 may be carried out by the variable length coding unit 1305 in the macroblock coding unit and a dedicated component that performs the processing may be included in the macroblock coding unit.

The variable length coding unit 1305 performs variable length coding when the result of determination is false (NO) in Step S1505 (Step S1507). More specifically, the variable length coding unit 1305 performs variable length coding on the quantized coefficient, the prediction mode, the parameter used in Steps S1501 to S1504 (the difference value of the quantization parameter QP, for example), thereby generating and outputting an intermediate stream (Step S1507).

Next, the inverse quantization unit 1306 and the inverse orthogonal transformation unit 1307 perform inverse quantization on the quantized coefficient and further perform inverse orthogonal transformation, thereby reconstructing an error image (Step S1508). The adding circuit 1308 adds the reconstructed error image to the prediction image that has been output from the intra picture prediction unit 1300 or the motion compensation prediction unit 1301, thereby generating and outputting a reconstructed image (Step S1509). When coding processing for one macroblock is completed as described above, the macroblock coding unit determines whether or not there still exists a macroblock MB to be coded (Step S1510). When it is determined that there is no macroblock MB to be coded (NO in Step S1510), the macroblock coding unit ends coding processing for the macroblock MB. When it is determined that there is a macroblock MB to be coded (YES in Step S1510), the macroblock coding unit performs the processing again starting from the determination of the prediction mode until there is no to-be-coded macroblock MB left (Step S1500).

Figure 13:
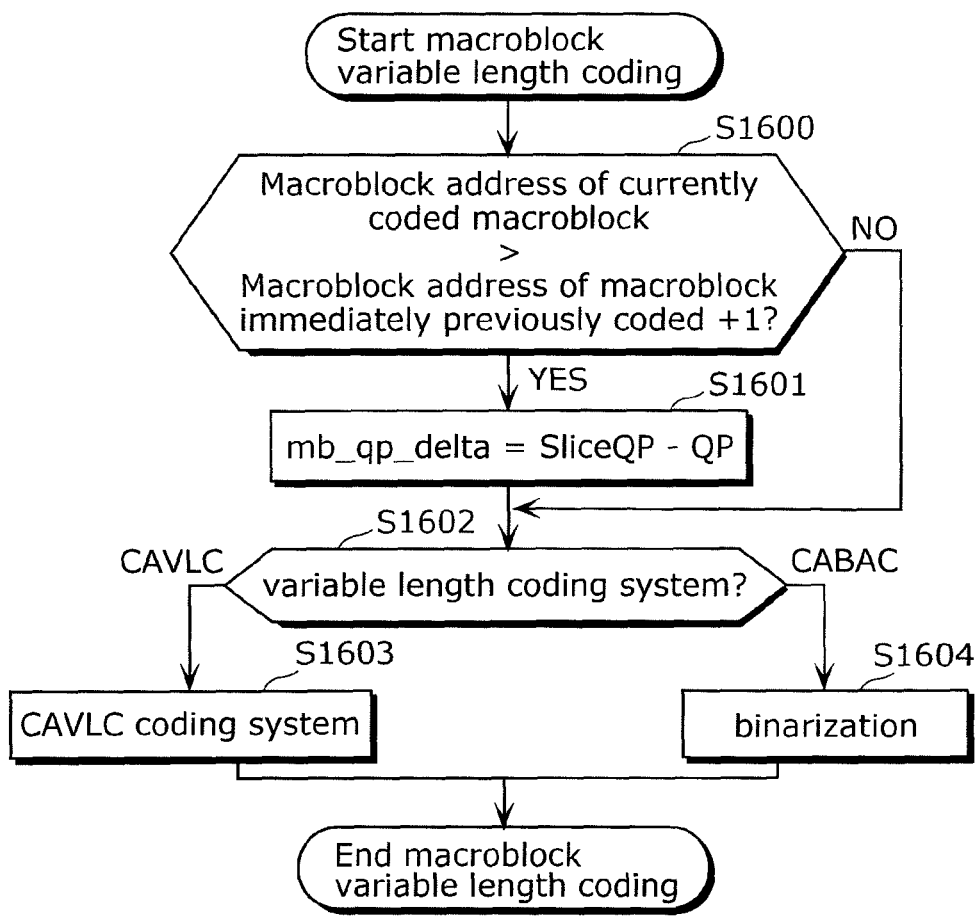
FIG. 13 is a flow chart which shows coding processing performed by the macroblock coding unit according to Embodiment 2 of the present invention.

The following describes variable length coding processing (Step S1507 in FIG. 12) in the coding processing on a macroblock (Step S1403 in FIG. 11) in detail with reference to FIG. 13.

FIG. 13 is a flow chart of the variable length coding processing.

First, the variable length coding 1305 determines whether or not a macroblock address of a macroblock MB to be currently coded (to-be-coded macroblock) is greater than a value obtained by adding one to a macroblock address of a macroblock MB coded immediately previously (immediately previously coded macroblock) (Step S1600). For example, in the case where coding is carried out by the procedure as shown in FIG. 5, the variable length coding unit 1305, in Step S1600, determines as true (YES) when the macroblock MB located at the left end of the picture Pic is coded as a to-be-coded macroblock MB. In other words, the macroblock MB that is determined here as true (YES) is located at the beginning of a macroblock line. When a result of the determination is true (YES) in Step S1600, the variable length coding unit 1305 replaces the difference value (mb_qp_delta) of the quantization parameter QP used for quantization on the to-be-coded macroblock MB, by a value obtained by subtracting the quantization parameter QP of the to-be-coded macroblock MB from the initial value (SliceQP) of the quantization parameter QP (Step S1601).

It is to be noted that, since it is only necessary to uniquely decode the value of the quantization parameter QP when recoding the slice data 604, the value used for replacement may be any value as long as the value is obtained by subtracting the quantization parameter QP of the to-be-coded macroblock MB from a given value. In addition, although exceeding a range of the difference value (mb_qp_delta), it may be replaced by a value of the quantization parameter QP of the to-be-coded macroblock MB.

Next, when the replacement of the difference value (mb_qp_delta) ends or when the result of the determination is false (NO) in Step S1600, the variable length coding unit 1305 determines whether the variable length coding system is CAVLC or CABAC (Step S1602). When the variable length coding system is determined as CAVLC, the variable length coding unit 1305 performs variable length coding in CAVLC coding system (Step S1603). On the other hand, when the variable length coding system is determined as CABAC, the variable length coding unit 1305 performs only binarization of coding processing of CABAC (Step S1604).

It is to be noted that, in the case where a result of the determination is true (YES) in Step S1600, processing for identifying the beginning of the macroblock MB determined as true (YES) in Step S1600 in the recoding processing may be performed on an intermediate stream generated by performing variable length coding of CAVLC (S1603) or binarization (S1604). In the case where the result of the determination is true (YES) in Step S1600, for example, the variable length coding unit 1305 stores an intermediate stream which is subsequently outputted, into an address different from the intermediate stream that has been outputted until immediately before. Or, the variable length coding unit 1305, when storing the intermediate stream into the stream buffer 1204, transmits, to the coding control unit 1200, an address at the beginning of the macroblock MB that has been determined as true (YES) in Step S1600. In this case, the slice data recoding unit 1205 is notified of the address from the coding control unit 1200, so that the intermediate stream (macroblock MB) to be recoded can be easily found. Or, the variable length coding unit 1305 inserts the MB start code at the beginning of the macroblock MB in the intermediate stream. In this case, the slice data recoding unit 1205 searches for the MB start code, so that the intermediate stream (macroblock MB) to be recoded can be easily found.

With that, the variable length coding processing for the macroblock is completed.

The following describes recoding processing on the slice data 604 (Step S1404 in FIG. 11) in detail.

Figure 14:
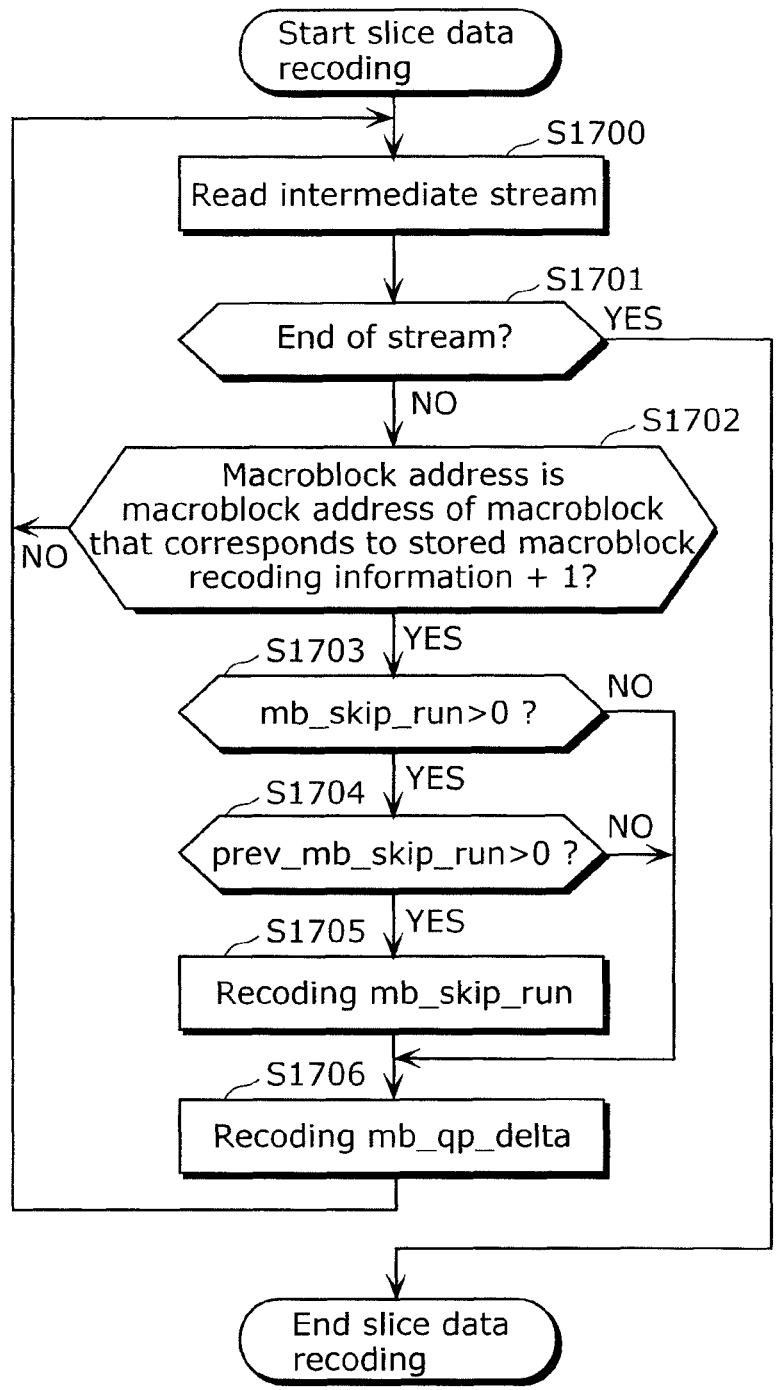
FIG. 14 is a flow chart which shows recoding processing on slice data on which variable length coding has been performed in CAVLC.

FIG. 14 is a flow chart which shows recoding processing on the slice data 604 on which variable length coding has been performed in CAVLC.

First, the slice data recoding unit 1205 sequentially reads macroblocks MB included in the intermediate stream in the order of macroblock addresses (Step S1700). Next, the slice data recoding unit 1205 determines whether or not a final position at which reading is completed in the intermediate stream becomes the end of the slice, by reading the intermediate stream. When it is determined that the final position becomes the end of the slice (YES in Step S1701), the slice data recoding unit 1205 ends the recoding processing. On the other hand, when it is determined that the final position does not become the end of the slice (NO in Step S1701), the slice data recoding unit 1205 compares a value obtained by adding one to a macroblock address of the macroblock MB (corresponding macroblock) that corresponds to the stored macroblock coding information with the macroblock address of the macroblock MB to be recoded (Step S1702). The slice data recoding unit 1205 reads the intermediate stream until the value obtained by adding one to the macroblock address of the corresponding macroblock MB matches the macroblock address of the macroblock MB to be recoded. The macroblock MB to be recoded that has been determined as matching in Step S1702 is the same as the macroblock MB that has been determined as true (YES) in S1600 of FIG. 13 and is located at the beginning of the macroblock line. Thus, it is possible to easily perform the determination in Step S1702 by performing processing for identifying the beginning of the macroblock MB that has been determined as true (YES) in S1600 in the case where an intermediate stream is stored in the stream buffer 1204.

When it is determined that the value obtained by adding one to the macroblock address of the corresponding macroblock MB matches the macroblock address of the macroblock MB to be recoded (YES in Step S1702), the slice data recoding unit 1205 first decodes a skip-run parameter (mb_skip_run) of the to-be-recoded macroblock MB and determines whether or not the skip-run parameter (mb_skip_run) is greater than 0 (Step S1703). Here, when it is determined that the skip-run parameter (mb_skip_run) is greater than 0 (YES in Step S1703), the slice data recoding unit 1205 decodes an immediately previous parameter (prev_mb_skip_run) that is a skip-run parameter (mb_skip_run) of a macroblock MB having an immediately previous macroblock address, and determines whether or not the immediately previous parameter (prev_mb_skip_run) is greater than 0 (Step S1704). Here, when it is determined that the immediately previous parameter (prev_mb_skip_run) is greater than 0 (YES in Step S1704), the slice data recoding unit 1205 removes, from the intermediate stream, the skip-run parameter (mb_skip_run) of the macroblock MB to be recoded, and change the skip-run parameter (mb_skip_run) of the immediately previous macroblock MB to a value by adding the immediately previous parameter (prev_mb_skip_run) to the skip-run parameter (mb_skip_run) of the to-be-recoded macroblock MB to recode the skip-run parameter (mb_skip_run) of the immediately previous macroblock MB (Step S1705).

Next, the slice data recoding unit 1205 performs recoding on the difference value (mb_qp_delta) of the quantization parameter QP of the to-be-recoded macroblock MB (Step S1706). Recoding the difference value (mb_qp_delta) is performed by the procedure below. First, the slice data recoding unit 1205 decodes the difference value (mb_qp_delta) of the to-be-recoded macroblock MB and calculates a quantization parameter QP of the to-be-recoded macroblock MB. Next, the slice data recoding unit 1205 receives the stored recoding information from the coding control unit 1200 and obtains, from the recoding information, the immediately previous quantization parameter (QP_PREV) that is a quantization parameter QP of the macroblock MB having an immediately previous macroblock address. Then, the slice data recoding unit 1205 subtracts the quantization parameter QP of the to-be-recoded macroblock MB from the immediately previous quantization parameter (QP_PREV), thereby recalculating a difference value (mb_qp_delta). Further, the slice data recoding unit 1205 removes the difference value (mb_qp_delta) of the to-be-recoded macroblock MB from the intermediate stream, codes the value which has been recalculated, and inserts into the intermediate stream. With the procedure as described above, recoding of the difference value (mb_qp_delta) is completed. A string of processes described above are repeated until the end of the slice.

Figure 15:
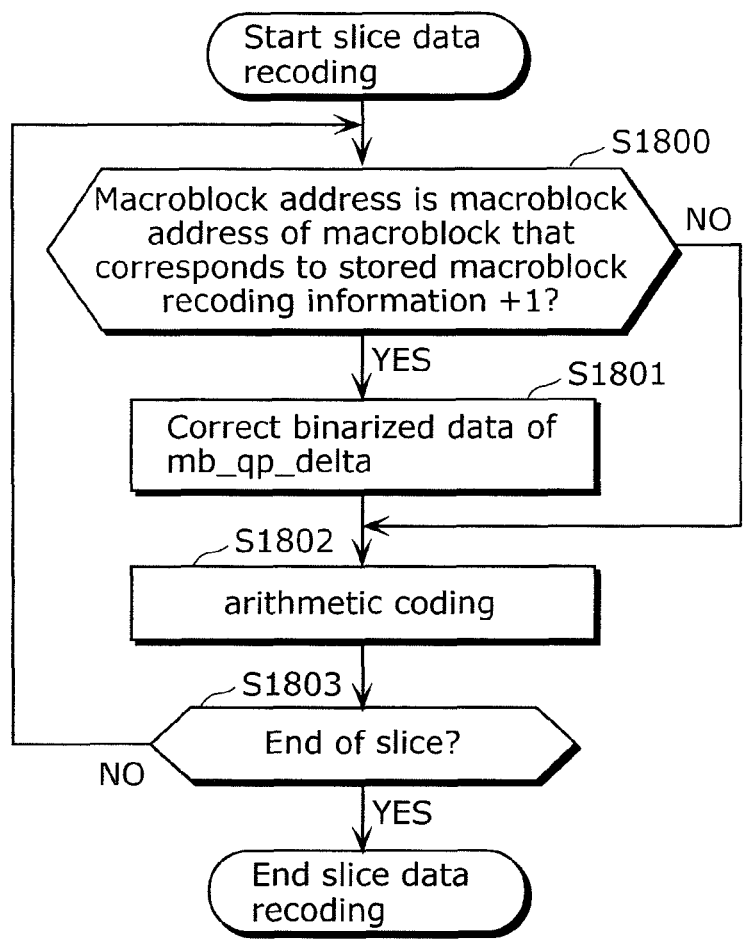
FIG. 15 is a flow chart which shows recoding processing on slice data on which variable length coding has been performed in CABAC.

FIG. 15 is a flow chart which shows recoding processing on the slice data 604 on which variable length coding has been performed in CAVLC.

In the case of CABAC, since the processing subsequent to the binarization is not carried out, recoding is necessary for the entire intermediate stream, which is significantly different from the case of CAVLC.

First, the slice data recoding unit 1205 compares the value obtained by adding one to the macroblock address of the macroblock MB (corresponding macroblock) that corresponds to the stored recoding information with the macroblock address of the to-be-recoded macroblock MB (Step S1800). The determination processing in Step S1800 is the same as the determination processing in Step S1702 of CAVLC as shown in FIG. 14. When it is determined that the value obtained by adding one to the macroblock address of the corresponding macroblock MB matches the macroblock address of the to-be-recoded macroblock MB (YES in Step S1800), the slice data recoding unit 1205 corrects binarized data of the difference value (mb_qp_delta) of the quantization parameter QP (Step S1801).

Correcting binarized data of the difference value (mb_qp_delta) is performed by the procedure below. First, the slice data recoding unit 1205 decodes the binarized data of the difference value (mb_qp_delta) of the to-be-recoded macroblock MB and calculates a quantization parameter QP of the to-be-recoded macroblock MB. Next, the slice data recoding unit 1205 receives the stored recoding information from the coding control unit 1200 and obtains, from the recoding information, the immediately previous quantization parameter (QP_PREV) that is a quantization parameter QP of the macroblock MB having an immediately previous macroblock address. Then, the slice data recoding unit 1205 subtracts the quantization parameter QP of the to-be-recoded macroblock MB from the immediately previous quantization parameter (QP_PREV), thereby recalculating the difference value (mb_qp_delta). Further, the slice data recoding unit 1205 removes the binarized data of the difference value (mb_qp_delta) of the to-be-recoded macroblock MB from the intermediate stream, and inserts the recalculated binarized data of the difference value (mb_qp_delta) into the intermediate stream. With the procedure as described above, correcting binarized data of the difference value (mb_qp_delta) is completed.

Next, the slice data recoding unit 1205 performs, on the binarized data, arithmetic coding processing subsequent to the binarization processing of CABAC (Step S1802). Then, the slice data recoding unit 1205 determines whether or not the to-be-recoded macroblock MB on which arithmetic coding has been performed is located at the end of the slice (Step S1803). When not located at the end (NO in Step S1803), the slice data recoding unit 1205 handles a macroblock MB to be recoded next as a new to-be-recoded macroblock MB, and repeats the processing starting from the Step S1800.

As described above, according to the present embodiment, it is possible to generate the same stream as the coded stream generated when plural macroblock lines are sequentially coded in a predetermined processing order by correcting a parameter performed by the slice data recoding unit 1205 even when two macroblock coding units perform coding on plural macroblock lines in parallel. As a result, it is possible to solve the processing order dependency existing in the new coding systems represented by H.264, and to speed up coding.

(Modification)

Here, a modification of the image coding apparatus 120 according to Embodiment 2 described above is described.

Whereas the image coding apparatus 120 according to Embodiment 2 described above includes the slice data recoding unit 1205, an image coding apparatus according to the present modification has a feature in solving the processing order dependency described above and coding the macroblock in parallel without including the slice data recoding unit 120.

Figure 16:
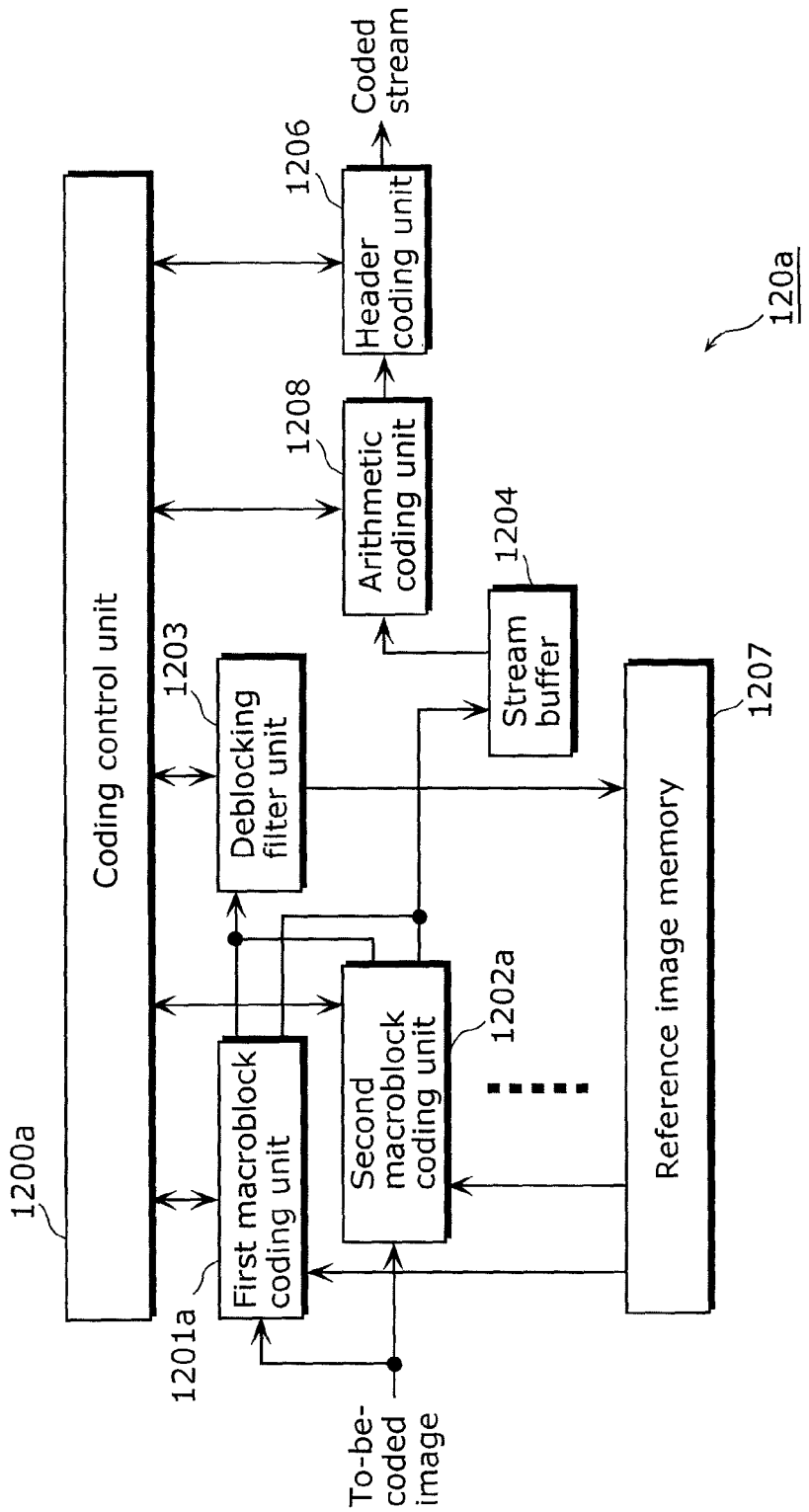
FIG. 16 is a block diagram of an image coding apparatus according to a modification of Embodiment 2 of the present invention.

FIG. 16 is a block diagram of an image coding apparatus according to the present modification.

The image coding apparatus 120*a* according to the present modification includes: a coding control unit 1200*a*; a first macroblock coding unit 1201*a*; a second macroblock coding unit 1202*a*; a deblocking filter unit 1203; a stream buffer 1204; an arithmetic coding unit 1208; a header coding unit 1206; and a reference image memory 1207. That means the image coding apparatus 120*a* according to the present modification, when compared to the image coding apparatus 120 of Embodiment 2, includes: the arithmetic coding unit 1208; the coding control unit 1200*a*; the first macroblock coding unit 1201*a*; and second macroblock coding unit 1202*a*, instead of the slice data recoding unit 1205, the coding control unit 1200, the first macroblock coding unit 1201, and the second macroblock coding unit 1202. It is to be noted that the first macroblock coding unit 1201*a* and the second macroblock coding unit 1202*a* are collectively called a macroblock decoding unit when distinction is not necessary.

Here, the image coding apparatus 120*a* according to the present modification is characterized by processing operations of the coding control unit 1200*a* and the macroblock coding unit. The processing operations eliminate the need for recoding processing performed by the slice data recoding unit 1205. The reason why the recoding processing is required is that, since two macroblock coding units respectively determine a parameter such as the quantization parameter QP and the skip-run parameter (mb_skip_run) according to the to-be-coded macroblock MB and code to-be-coded macroblocks MB in parallel, one macroblock coding unit codes a to-be-coded macroblock MB without recognizing the parameter used in the other macroblock coding unit, and thus the processing order dependency is not satisfied.

Thus, the image coding apparatus 120*a* according to the present modification is characterized by the processing operation of which the coding control unit 1200*a* specifies the parameter (the quantization parameter QP, or the skip-run parameter (mb_skip_run) in the case where the variable length coding system is CAVLC) in advance so that the above-described one macroblock coding unit recognizes the parameter used in the other macroblock coding unit, and two macroblock coding units respectively use the specified parameter and code a to-be-coded macroblock MB. Thus, according to the present modification, the coding control unit 1200*a* serves as an adjusting unit, and the coding control unit 1200*a* adjusts the parameter which is included in an intermediate stream generated by two block coding units and is used for coding, thereby matching the intermediate stream to the coded stream generated by sequentially coding, in a predetermined processing order, plural macroblock lines included in a picture.

FIG. 17 is a flow chart which shows operations of the image coding apparatus 120*a* according to the present modification.

The image coding apparatus 120*a* according to the present modification sequentially performs coding of the SPS header 601 (Step S1400), coding of the PPS header 602 (Step S1401), and coding of the slice header 603 (Step S1402) in the same manner as the operations of the image coding apparatus 120 as shown in FIG. 11. When the coding of the slice header 603 (Step S1402) is completed, the coding control unit 1200*a* determines in advance quantization parameter QP of a predetermined macroblock MB and, in the case where the variable length coding system is CAVLC, a skip-run parameter (mb_skip_run) of a macroblock MB different from the predetermined macroblock MB, before coding the macroblocks MB in order to make recoding processing for satisfying the processing order dependency unnecessary (Step S1410).

More specifically, the coding control unit 1200*a* determines a quantization parameter QP used for the macroblocks MB located at the right end, other than the bottom end, of the picture Pic among macroblocks MB included in a slice to be coded and, in the case where the variable length coding system is CAVLC, a skip-run parameter (mb_skip_run) located at the left end, other than the upper end, of the picture Pic.

Next, the first macroblock coding unit 1201*a* and the second macroblock coding unit 1202*a* code the to-be-coded image on a macroblock basis according to the instruction from the coding control unit 1200*a* (Step S1411). At this time, the first macroblock coding unit 1201*a* and the second macroblock coding unit 1202*a* code the macroblock MB according to the quantization parameter QP or the skip-run parameter (mb_skip_run) determined in Step S1410. It is to be noted that, when performing variable length coding on the macroblock MB in CABAC, each of the first macroblock coding unit 1201*a* and the second macroblock coding unit 1202*a* performs only binarization processing from among binarization processing and arithmetic coding processing included in the variable length coding processing, instead of performing all of the variable length coding processing. That means, in this case, the slice data of the intermediate stream stored in the stream buffer 1204 is binarized data.

Further, the coding control unit 1200*a* determines whether the variable length coding system in which the macroblock coding unit is caused to execute is CABAC or CAVLC (Step S1412). Here, when it is determined that the variable length coding system is CABAC, the coding control unit 1200*a* instructs the arithmetic coding unit 1208 to perform arithmetic coding on the slice data which is binarized data and included in the intermediate stream (Step S1413). It is to be noted that the slice data described above is composed of a set of macroblocks MB, for one slice, coded in Step S1411. On the other hand, when it is determined that the variable length coding system is CAVLC, the coding control unit 1200*a* instructs the arithmetic coding unit 1208 to output the intermediate stream to the header coding unit 1206 without performing arithmetic coding processing.

Subsequently, the image coding apparatus 120*a* performs processing of Steps S1405 to S1407 in the same manner as operations of image coding apparatus 120 as shown in FIG. 11, thereby coding to-be-coded image for one sequence.

Figure 18A:
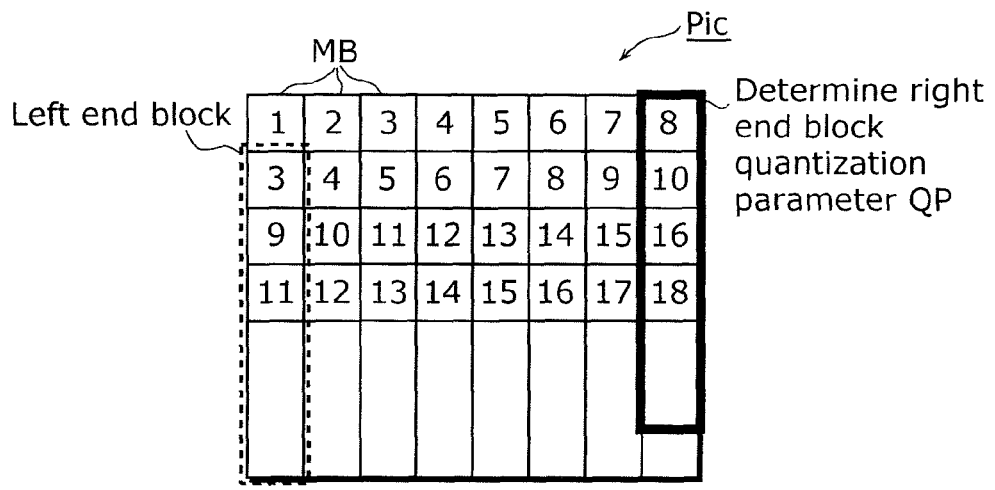
FIG. 18A is a diagram which shows a position of a macroblock for which a quantization parameter is determined according to the modification of Embodiment 2 of the present invention.

FIG. 18A is a diagram which shows a position of a macroblock MB for which the quantization parameter QP is determined.

The coding control unit 1200*a* determines in advance the quantization parameter QP for the macroblock MB located at the right end, other than the bottom end, of the picture Pic (right end macroblock) before coding the slice. Then, the macroblock coding unit codes the right end macroblock MB according to the quantization parameter QP that has been determined. This allows the macroblock coding unit to recognize, when coding the macroblock MB located at the left end, other than the upper end, of the picture Pic (left end macroblock), the immediately previous quantization parameter (QP_PREV) that is the quantization parameter QP which has already been determined for the right end macroblock MB located immediately previous to left end macroblock MB. As a result, the macroblock coding unit subtracts the quantization parameter QP of the left end macroblock MB that is the to-be-coded macroblock MB from the immediately previous quantization parameter (QP_PREV), thereby calculating and coding the difference value of the left end macroblock MB (mb_qp_delta) with satisfying the processing order dependency and without performing recoding processing.

Figure 18B:
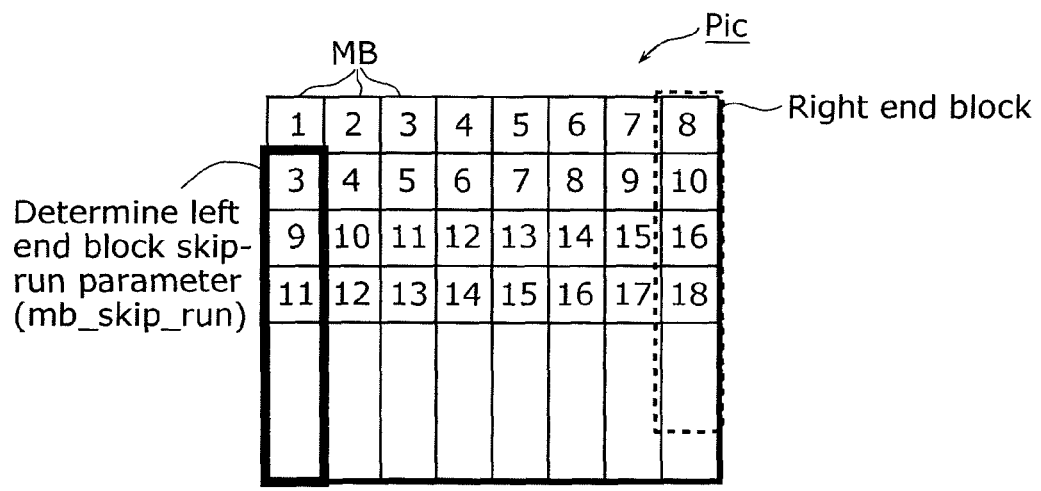
FIG. 18B is a diagram which shows a position of a macroblock for which a skip-run parameter is determined, according to the modification of Embodiment 2 of the present invention.

FIG. 18B is a diagram which shows the position of a macroblock MB for which a skip-run parameter (mb_skip_run) is determined.

The coding control unit 1200*a* determines in advance the skip-run parameter (mb_skip_run) for the macroblock MB located at the left end, other than the upper, of the picture Pic (left end macroblock) before coding the slice. Then, the macroblock coding unit codes the left end macroblock MB according to the skip-run parameter (mb_skip_run) that has been determined. This allows the macroblock coding unit to recognize, when coding the macroblock MB located at the right end, other than the bottom end, of the picture Pic (right end macroblock), the skip-run parameter (mb_skip_run) which has already been determined for the left end macroblock MB located immediately subsequent to right end macroblock MB. As a result, the macroblock coding unit can, in consideration of the skip-run parameter (mb_skip_run) of the left end macroblock MB, determine and code the skip-run parameter (mb_skip_run) of the right end macroblock MB that is the macroblock to be coded, with satisfying the processing order dependency and without performing recoding processing.

FIG. 19 is a flow chart which shows in detail coding processing performed by the macroblock coding unit according to the present modification (Step S1411 in FIG. 17).

The macroblock coding unit according to the present modification performs prediction mode determination processing (Step S1500), intra picture prediction (Step S1501), motion compensation prediction processing (Step S1502), subtracting processing (Step S1503), and orthogonal transformation/quantization processing (Step S1504) in the same manner as the coding processing as shown in FIG. 12. At this time, the macroblock coding unit performs processing by using the parameter that has already been determined as described above.

Next, the macroblock coding unit according to the present modification performs variable length coding processing (Step S1507*a*) without performing determination processing as shown in FIG. 12 (Step S1505) and recoding information storing processing (Step S1506). Then, the macroblock coding unit performs adding processing (Step S1509) and determination processing (Step S1510) in the same manner as the coding processing as shown in FIG. 12, thereby coding the macroblock MB for one slice.

Figure 20:
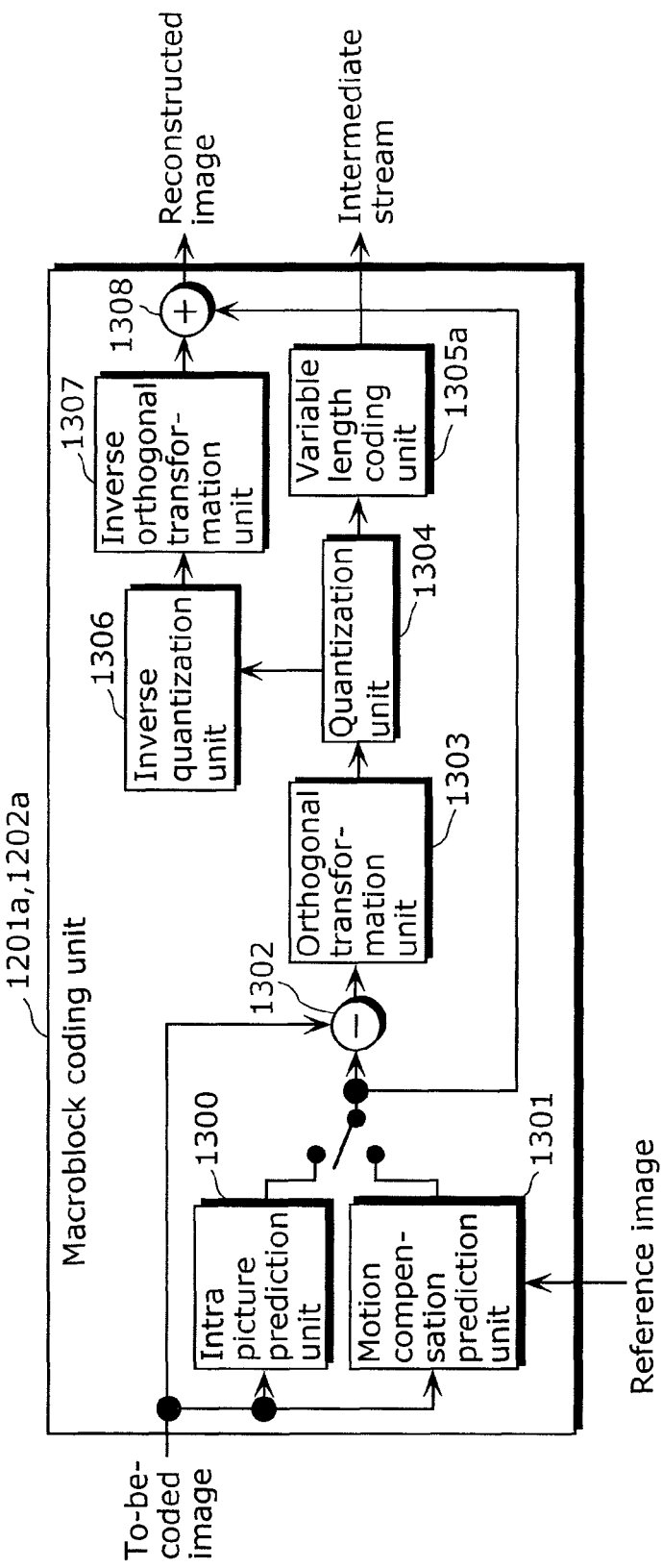
FIG. 20 is a block diagram of the macroblock coding unit according to the modification of Embodiment 2 of the present invention.

FIG. 20 is a block diagram of the macroblock coding unit according to the present modification.

The first macroblock coding unit 1201*a* and the second macroblock coding unit 1202*a* according to the present modification have the same configuration, each of which includes: an intra picture prediction unit 1300; a motion compensation prediction unit 1301; a subtracting circuit 1302; an orthogonal transformation unit 1303; a quantization unit 1304; a variable length coding unit 1305*a*; an inverse quantization unit 1306; an inverse orthogonal transformation unit 1307; and an adding circuit 1308. To put it differently, the macroblock coding unit according to the present modification includes the variable length coding unit 1305*a* instead of the variable length coding unit 1305 of the macroblock coding unit according to Embodiment 2 as shown in FIG. 10, and the same components as in the macroblock coding unit according to Embodiment 2 for other components.

The variable length coding unit 1305*a* according to the present modification performs variable length coding according to CAVLC or CABAC coding system without replacing the difference value (mb_qp_delta) of the quantization parameter QP and the like unlike the variable length coding unit 1305 according to Embodiment 2.

Figure 21:
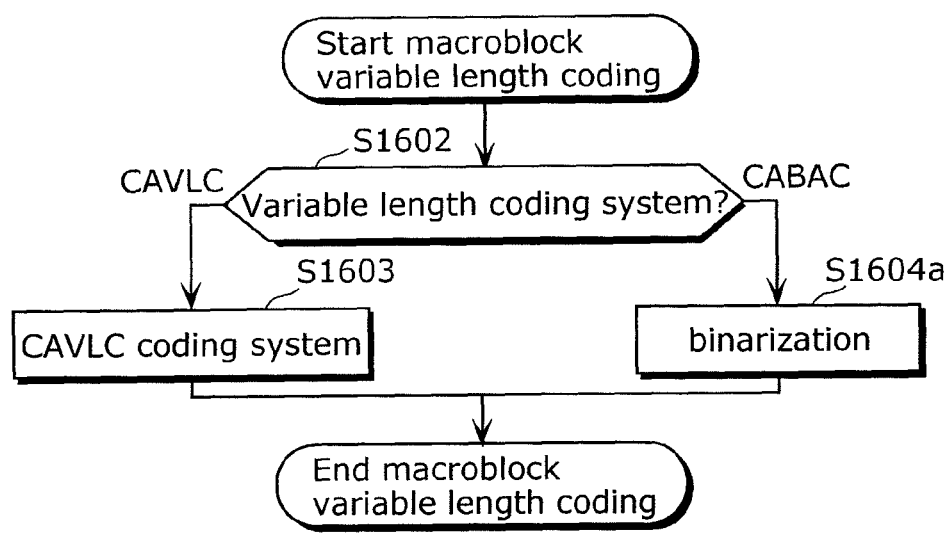
FIG. 21 is a flow chart which shows details of variable length coding performed by a variable length coding unit.

FIG. 21 is a flow chart which shows details of variable length coding processing performed by the variable length coding unit 1305*a* (Step S1507*a* in FIG. 19).

The variable length coding unit 1305*a* according to the present modification first determines whether the variable length coding system is CAVLC or CABAC (Step S1602). When the variable length coding system is determined as CAVLC, the variable length coding unit 1035*a* performs variable length coding in CAVLC coding system (Step S1603). On the other hand, when the variable length coding system is determined as CABAC, the variable length coding unit 1305 performs only binarization processing from among binarization processing and arithmetic coding processing, both of which are included in the variable length coding processing in CABAC (Step S1604*a*).

According to the present modification as described above, since a parameter which has a processing order dependency is determined among parameters used for coding performed by each of the macroblock coding units and then coding is carried out by using the parameter, each of the macroblock coding units can recognize, in advance, the parameter used for coding performed by the other macroblock coding unit, even when the coding has not yet been carried out. As a result, each of the macroblock coding units can perform coding to the end even on a parameter having the processing order dependency, and thus can easily generate coded stream in which the processing order dependency is solved and recoding is unnecessary.

It is to be noted that, in the modification described above, the quantization parameter QP or the skip-run parameter (mb_skip_run) are determined only for a part of the macroblocks MB included in the slice. However, the above-described parameter may be determined for all of the macroblocks MB included in the slice.

In addition, according to Embodiment 2, recoding information that is the parameter which is necessary in advance for recoding process of the slice data 604 is given to the slice data recoding unit 1205 via the coding control unit 1200. However, it is only necessary to transmit the recoding information to the slice data recoding unit, and not necessarily have to pass the recoding information via the coding control unit 1200. The recoding information may, for example, be embedded into the intermediate stream as performed in the image decoding apparatus according to Embodiment 1.

In addition, according to Embodiment 2 and the modification described above, two macroblock coding units are used for coding the pixel data in parallel. However, the number of macroblock coding units is not limited to two. The Patent Literature 1 discloses the method for coding pixel data in parallel using more than two macroblock coding units. According to the method, coding can be carried out by using more than two macroblock coding units.

In addition, according to Embodiment 2 and the modification described above, all or a part of components included in each of the image coding apparatus 120 and 120a may be mounted on a single integrated circuit, may be implemented as plural integrated circuits mounted on a single circuit board, or may be implemented as an independent apparatus connected via a network or a bus.

Further, according to Embodiment 2 described above, at the macroblock MB at the beginning of a slice, the quantization parameter (QP_PREV) of the immediately previous macroblock MB used for calculating the difference value (mb_qp_delta) is the initial value (SliceQP) of the quantization parameter QP that is known before coding the macroblock MB, and thus recoding the difference value (mb_qp_delta) is not required. Thus, the slice may be delimited at the point where the macroblock address of the macroblock MB to be coded next by the macroblock coding unit becomes greater than a value obtained by adding one to the macroblock address of the macroblock MB that is currently coded. This makes it possible to eliminate the need to recode the difference value (mb_qp_delta) of any macroblocks MB.

The image decoding apparatus and the image coding apparatus according to the present invention have been described using Embodiments 1 and 2, and the modifications. However the present invention is not limited to the above.

For example, a part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program. Furthermore, each unit of the constituent elements configuring the respective apparatuses may be made as separate individual chips, or as a single chip to include a part or all thereof. Furthermore, here, it is called System-LSI but there are instances where it is called IC, LSI, super LSI, and ultra LSI, due to a difference in the degree of integration. Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appear thorough progress in semiconductor technology or other derived technology, that technology can naturally be used to carry out integration of the constituent elements. Biotechnology is anticipated to apply.

Further, according to the each of Embodiments and the modification described above, each component may be configured from dedicated hardware, or components that can be implemented by software may be implemented by executing a program. For example, a program executing unit such as CPU reads and executes a software program recorded on a recording medium such as a hard disk or a semiconductor memory, thereby implementing each of the components.

Further, Embodiments 1 and 2, and the modifications may arbitrarily be combined unless they involve inconsistency.

INDUSTRIAL APPLICABILITY

The image decoding apparatus and the image coding apparatus according to the present invention are capable of decoding and coding video data at high speed, and useful to be applied for, for example, a digital television handling a compressed image such as MPEG, a DVD recorder, Blu-ray disc recorder, and the like. In addition, they are also applicable to devices which require high speed processing, such as those in a broadcasting station.

REFERENCE SIGNS LIST 40 image decoding apparatus
120, 120a image coding apparatus
400 decoding control unit
401 header decoding unit
402 slice data predecoding unit
403 stream buffer
404 first macroblock decoding unit
405 second macroblock decoding unit
406 deblocking filter unit
407 reference image memory
500 variable length decoding unit
501 inverse quantization unit
502 inverse orthogonal transformation unit
503 intra picture prediction unit
504 motion compensation prediction unit
505 adding circuit
600 start code
601 SPS header
602 PPS header
603 slice header
604 slice data
1000 MB start code
1001 macroblock decoding information
1002 macroblock layer data
1200, 1200a coding control unit
1201, 1201a first macroblock coding unit
1202, 1202a second macroblock coding unit
1203 deblocking filter unit
1204 stream buffer
1205 slice data recoding unit
1206 header decoding unit
1207 reference image memory
1300 intra picture prediction unit
1301 motion compensation prediction unit 1302 subtracting circuit
1303 orthogonal transformation unit
1304 quantization unit
1305 variable length coding unit
1306 inverse quantization unit
1307 inverse orthogonal transformation unit
1308 adding circuit

The invention claimed is:

1. An image decoding apparatus which decodes a coded stream generated by coding, on a block-by-block basis, a picture including blocks, said image decoding apparatus comprising:
a processor; and
a non-transitory memory which stores thereon executable instructions, which when executed, cause the processor to function as:
a predecoding unit configured to perform, on a block group-by-block group basis, variable length decoding and generate block decoding information using a result of the variable length decoding for each block group from among a plurality of block groups which (i) contain blocks, (ii) are different from each other, and (iii) are included in the coded stream, the block decoding information for the block group being a parameter necessary for decoding another block group from among the plurality of block groups; and
block decoding units each configured to perform decoding, using the block decoding information generated using the result of the variable length decoding performed by said predecoding unit, on a block-by-block basis on one of the plurality of block groups in parallel,
wherein the decoding performed by each of said block decoding units on the block-by-block basis on the one of the plurality of block groups in parallel includes re-executing the variable length decoding on each of the plurality of blocks groups on which the variable length decoding has been performed by said predecoding unit to determine a prediction mode to be performed on the block group.

2. The image decoding apparatus according to claim 1,
wherein said predecoding unit is further configured to insert, at a beginning of each of the block groups in the coded stream, a bit pattern by which the beginning can be identified uniquely, and
wherein each of said block decoding units is configured to search for the bit pattern inserted into the coded stream to find a block group on which the decoding is to be performed by said block decoding unit, and to decode the block group.

3. The image decoding apparatus according to claim 1,
wherein said predecoding unit is further configured to insert the generated block decoding information into the coded stream, and
wherein each of said block decoding units is configured (i) to obtain the coded stream into which the block decoding information is inserted, and (ii) to perform the decoding on the corresponding one of the block groups by using the block decoding information inserted into the coded stream.

4. The image decoding apparatus according to claim 1,
wherein said predecoding unit is configured to generate, as the block decoding information, a parameter necessary for the decoding of a block located at an end in the block group when generating the block decoding information, the parameter being obtained by performing the variable length decoding on the block group.

5. The image decoding apparatus according to claim 1,
wherein said predecoding unit, when generating the block decoding information, is configured to generate, as the block decoding information, a difference between a predetermined coefficient and a coefficient which is obtained by performing the variable length decoding on the block group and is necessary for the decoding of a block located at an end in the block group.

6. The image decoding apparatus according to claim 1,
wherein said predecoding unit is configured to generate the block decoding information to include at least a quantization parameter.

7. An image decoding method for decoding, using a processor, a coded stream generated by coding, on a block-by-block basis, a picture including blocks, said image decoding method comprising: performing, on a block group-by-block group basis, variable length decoding, and generating block decoding information using a result of the variable length decoding for each of a plurality of block groups which (i) contain blocks, (ii) are different from each other, and (iii) are included in the coded stream, the block decoding information for the block group being a parameter necessary for decoding another block group from among the plurality of block groups; and decoding, on a block-by-block basis using the block decoding information generated using the result of the variable length decoding performed in said performing, each of the plurality of block groups in parallel, wherein said decoding performed on the block-by-block basis on each of the plurality of block groups in parallel includes re-executing the variable length decoding on each of the plurality of block groups on which the variable length decoding has been performed in said performing to determine a prediction mode to be performed on the block group.

8. The image decoding method according to claim 7,
wherein in said predecoding, the block decoding information is generated to include at least a quantization parameter.

9. A non-transitory computer readable recording medium having stored thereon a program for decoding a coded stream generated by coding, on a block-by-block basis, a picture including blocks, wherein, when executed, said program causes a computer to execute a method comprising:
performing, on a block group-by-block group basis, variable length decoding, and generating block decoding information using a result of the variable length decoding for each of a plurality of block groups which (i) contain blocks, (ii) are different from each other, and (iii) are included in the coded stream, the block decoding information for the block group being a parameter necessary for decoding another block group from among the plurality of block groups; and
decoding, on a block-by-block basis using the block decoding information generated using the result of the variable length decoding performed in said performing, each of the plurality of block groups in parallel,
wherein said decoding performed on the block-by-block basis on each of the plurality of block groups in parallel includes re-executing the variable length decoding on each of the plurality of block groups on which the variable length decoding has been performed in said performing to determine a prediction mode to be performed on the block group.

10. The non-transitory computer readable recording medium according to claim 9,
wherein in said predecoding, the block decoding information is generated to include at least a quantization parameter.

11. An integrated circuit which decodes a coded stream generated by coding, on a block-by-block basis, a picture including blocks, said integrated circuit comprising:
- a processor; and
- a non-transitory memory which stores thereon executable instructions, which when executed, cause the processor to function as:
  - a predecoding unit configured to perform, on a block group-by-block group basis, variable length decoding and generate block decoding information using a result of the variable length decoding for each block group from among a plurality of block groups which (i) contain blocks, (ii) are different from each other, and (iii) are included in the coded stream, the block decoding information for the block group being a parameter necessary for decoding another block group from among the plurality of block groups; and
  - block decoding units each configured to perform decoding, using the block decoding information generated using the result of the variable length decoding performed by said predecoding unit, on a block-by-block basis on one of the plurality of block groups in parallel,
- wherein the decoding performed by each of said block decoding units on the block-by-block basis on the one of the plurality of block groups in parallel includes re-executing the variable length decoding on each of the plurality of block groups on which the variable length decoding has been performed by said predecoding unit to determine a prediction mode to be performed on the block group.

12. The integrated circuit according to claim 11,
wherein said predecoding unit is configured to generate the block decoding information to include at least a quantization parameter.

13. An image decoding apparatus which decodes a coded stream generated by coding, on a block-by-block basis, a picture including blocks, said image decoding apparatus comprising:
- a processor; and
- a non-transitory memory which stores thereon executable instructions, which when executed, cause the processor to function as:
  - a predecoding unit configured to perform, on a block group-by-block group basis, variable length decoding and generate block decoding information using a result of the variable length decoding for each block group from among a plurality of block groups which (i) contain blocks, (ii) are different from each other, and (iii) are included in the coded stream, the block decoding information for the block group including at least a quantization parameter as a parameter necessary for decoding another block group from among the plurality of block groups; and
  - block decoding units each configured to perform the decoding, using the block decoding information generated using the result of the variable length decoding performed by said predecoding unit, on a block-by-block basis on one of the plurality of block groups in parallel,
- wherein the decoding performed by each of said block decoding units on the block-by-block basis on the one of the plurality of block groups in parallel includes re-executing the variable length decoding on each of the plurality of block groups on which the variable length decoding has been performed by said predecoding unit to determine a prediction mode to be performed on the block group.

14. An image decoding method for decoding, using a processor, a coded stream generated by coding, on a block-by-block basis, a picture including blocks, said image decoding method comprising: performing, on a block group-by-block group basis, variable length decoding, and generating block decoding information using a result of the variable length decoding for each of a plurality of block groups which (i) contain blocks, (ii) are different from each other, and (iii) are included in the coded stream, the block decoding information for the block group including at least a quantization parameter as being a parameter necessary for decoding another block group from among the plurality of block groups; and decoding, on a block-by-block basis using the block decoding information generated using the result of the variable length decoding performed in said performing each of the plurality of block groups in parallel, wherein said decoding performed on the block-by-block basis on each of the plurality of block groups in parallel includes re-executing the variable length decoding on each of the plurality of block groups on which the variable length decoding has been performed in said performing to determine a prediction mode to be performed on the block group.

* * * * *